(12) United States Patent
Ezawa et al.

(10) Patent No.: US 7,844,983 B2
(45) Date of Patent: Nov. 30, 2010

(54) POWER TRANSMISSION MEMBER FOR HEAD MOVEMENT MECHANISM, AND DISK DEVICE EQUIPPED WITH THE HEAD MOVEMENT MECHANISM

(75) Inventors: Kozo Ezawa, Osaka (JP); Kisaburo Kurobe, Osaka (JP); Tomohiro Sasao, Ehime (JP)

(73) Assignee: Panasonic Corporation, Osaka (JP)

( * ) Notice: Subject to any disclaimer, the term of this patent is extended or adjusted under 35 U.S.C. 154(b) by 671 days.

(21) Appl. No.: 11/918,782

(22) PCT Filed: Apr. 18, 2006

(86) PCT No.: PCT/JP2006/308145

§ 371 (c)(1),
(2), (4) Date: Oct. 18, 2007

(87) PCT Pub. No.: WO2006/115127

PCT Pub. Date: Nov. 2, 2006

(65) Prior Publication Data

US 2009/0064215 A1 Mar. 5, 2009

(30) Foreign Application Priority Data

Apr. 19, 2005 (JP) ............................. 2005-120567

(51) Int. Cl.
*G11B 17/04* (2006.01)
(52) U.S. Cl. .................................................. 720/659
(58) Field of Classification Search .................. 720/659, 720/601, 635, 681; 369/223, 112.29, 13.02, 369/44.14; 361/714
See application file for complete search history.

(56) References Cited

U.S. PATENT DOCUMENTS 5,696,494 A * 12/1997 Chen ....................... 340/815.4

(Continued)

FOREIGN PATENT DOCUMENTS

JP        5-234281       9/1993

(Continued)

OTHER PUBLICATIONS

International Search Report issued Aug. 8, 2006 in International (PCT) Application PCT/JP2006/308145.

*Primary Examiner*—Allen T Cao
(74) *Attorney, Agent, or Firm*—Wenderoth, Lind & Ponack, L.L.P.

(57) ABSTRACT

A power transmission member is provided with which it is possible to lessen the impact force produced when the head of a disk device hits part of a base member or the like. The power transmission member is a power transmission member of a mechanism for moving a head, used for recording on or reproducing from a disk, relative to a base member in a disk device, comprising a fixed component for attaching to a head, a power transmission component for receiving drive from a motor serving as a drive source, a linking component for linking the fixed component and the power transmission component, and a contacting component. The contacting component is fixed to the power transmission component, and comes into contact with part of the base member, or part of a member fixed to the base member, at least one end of the movement range of the head. The contacting component is also linked to the fixed component via the linking component in a state in which elastic deformation is possible only when an impact or the like creates an excessive force in the movement direction of the head.

12 Claims, 19 Drawing Sheets

U.S. PATENT DOCUMENTS

| | | | |
|---|---|---|---|
| 2006/0096400 A1* | 5/2006 | Shinmura et al. | 74/425 |
| 2008/0123477 A1* | 5/2008 | Liu et al. | 369/30.33 |
| 2010/0011522 A1* | 1/2010 | Kim et al. | 15/3 |

FOREIGN PATENT DOCUMENTS

| | | |
|---|---|---|
| JP | 10-74370 | 3/1998 |
| JP | 2000-260133 | 9/2000 |
| JP | 1 058 243 | 12/2000 |
| JP | 2000-339882 | 12/2000 |

* cited by examiner

POWER TRANSMISSION MEMBER FOR HEAD MOVEMENT MECHANISM, AND DISK DEVICE EQUIPPED WITH THE HEAD MOVEMENT MECHANISM

TECHNICAL FIELD

The present invention relates to a power transmission member for a head movement mechanism in a disk device. The present invention also relates to a disk device equipped with the head movement mechanism.

BACKGROUND ART

Devices that record on or reproduce from disk-shaped recording media, such as optical disk devices for a CD (compact disk), DVD (digital versatile disk), BD (Blu-ray disk), or the like, or magneto-optical disk devices for an MO (magneto-optical disk), MD (mini-disk), or the like, or recording and reproduction magnetic disk devices for an FD (floppy (registered trademark) disk) or the like, and the various disk media used in these devices have already gained widespread acceptance in the world.

Furthermore, technology aimed at increasing recording density is proceeding at a rapid pace today, and this progress brings with it the need for higher precision in the above-mentioned disk devices. In particular, the highest precision is required of the heads acting directly on recording or reproduction on disks.

Meanwhile, the price of these disk devices continues to drop in the marketplace, and the parts, materials, and methods used to make these devices need to be inexpensive yet highly functional.

Also, from the standpoint of lowering transportation costs at the same time, the ideal packaging used to ship these devices is one that is as simple as possible. Reducing the cushioning material used to protect packaged devices has therefore become a goal. The trend today is also toward limiting the use of foamed resins, which are effective as materials used for cushioning, in the viewpoint of environmental protection.

Because the above-mentioned disk devices are thus becoming increasingly precise while fewer options are available for protecting the finished products, either the product strength needs to be increased, or the product itself needs to be capable of protecting its own weak points.

For instance, with an optical disk device that performs recording or reproduction by directing light beam from an optical head at an optical disk that is rotated by a rotation mechanism, the optical head is made up of many optical parts that need to have high precision. Although increasing the joint strength of parts or increasing the part strength itself is one way in order to maintain the precision even after the device has been subjected to an impact or other excessive external force, this often leads to higher unit part prices or more labor in joining the parts. In view of this, it is effective to employ a method that avoids subjecting the optical head to such impact force.

An example of a conventional optical disk device will now be described through reference to FIGS. 16 to 18. The structures of the device have been disclosed in Japanese Laid-Open Patent Application H10-74370, for example.

The optical head in an optical disk device is generally guided and moved in a radial direction of the disk. If it is subjected to an impact force in this movement direction, the optical head may be forcibly moved to the inside or outside in the radial direction and hit the base member, or a part integrally supported by the base member, at the stop position at the movement range limit. This subjects the optical head to a tremendous impact force. This can cause damages that directly and adversely affects performance of the device, such as damaging the internal parts that make up the optical head, reducing the positional precision between the constituent parts and the like.

FIG. 16 is an example of the mechanism for recording or reproducing with a conventional disk device. In FIG. 16, 33 is a spindle motor for rotationally driving a disk 31. The spindle motor 33 includes a turntable on which the disk 31 is placed and fixed. A chucking member for fixing the disk 31 is not shown in FIG. 16, 34 is an optical head that emits a light beam, 35A and 35B are guide shafts for guiding the optical head 34 in the radial direction of the disk placed on the turntable, 37A, 37B, 37C, and 37D are bearings that support the guide shafts 35A and 35B, 39 is a movement motor that serves as a drive source for moving the optical head 34 in the radial direction of the disk placed on the turntable, 38 is a lead screw comprising a spiral groove provided around the peripheral face of a shaft thereof and which is rotated by the drive force of the movement motor 39, 41 is a transmission member unit that engages with the lead screw 38 and transmits a propulsion force that moves the optical head 34 in the disk radial direction, and 32 is a chassis that integrally supports the above-mentioned members. 32A and 32B are an inner peripheral stopper and outer peripheral stopper, respectively, for limiting the movement of the optical head 34 at the disk innermost peripheral location and outermost peripheral location, respectively. The optical head 34 comes into contact with the inner peripheral stopper 32A and the outer peripheral stopper 32B at the innermost peripheral location and outermost peripheral location, respectively.

FIG. 17 is a detail diagram of the portion in which the transmission member unit 41 in FIG. 16 is fixed to the optical head 34 and engages with the lead screw 38 shown in FIG. 18. In FIG. 17, 43 is a tooth component that engages with the spiral groove provided around the axial peripheral face of the lead screw 38, and is supported by an elastic support member 42. 44 is a compression spring for biasing the tooth component 43 toward the lead screw 38, and 46 is a tooth component thrust limiting member for limiting the position of the tooth component 43 with respect to the axial direction of the lead screw 38. The tooth component thrust limiting member 46 is disposed with a specific gap between itself and the tooth component 43. These members are integrally constituted on an attachment base 45 and fixed and supported by the optical head 34.

With the configurations in FIGS. 16 and 17, the optical head 34 is moved in the radial direction of the disk 31 by driving the movement motor 39, and recording or reproduction is performed at a specific radial position of the disk 31.

FIG. 18 is a diagram of the detailed structure of the engagement portion between the tooth component 43 and the lead screw 38 as seen in the direction of the arrow PJ2 in FIG. 17. As shown in FIG. 18, when the lead screw 38 turns in the direction of the arrow R11, the tooth component 43 is subjected to moment in the direction of the arrows D11 and D13. At this point, the optical head 34 is subjected to force from the tooth component 43 via the attachment base 45 and the elastic support member 42, and is subjected to force in the D12 direction. Thus, the optical head 34 obtains a propulsion force in the radial direction of the disk. At the same time, the tooth faces of the tooth component 43 are subjected to force in the direction away from the lead screw 38, but this is blocked by the biasing force of the compression spring 44.

However, when excessive drive force is produced by the lead screw 38 due, for example, to a loss of control of the movement motor 39, and excessive propulsion force is generated in the direction of the arrow D11, the moment in the direction of the arrow D13 also increases, resulting in a state in which the meshing of the tooth component 43 and the lead screw 38 is irregular.

This irregular state is suppressed by limiting displacement with the tooth component thrust limiting member 46 when the tooth component 43 comes into contact with a limiting face 46A or limiting face 46B. This keeps the meshing in a regular state.

However, when the optical head 34 is subjected to an excessive external force, such as impact force, in its movement direction, the tooth component 43 may come out of the groove of the lead screw 38, so that the engagement cannot be maintained, even though the tooth component 43 is restricted in its displacement in the movement direction by the tooth component thrust limiting member 46. Consequently, the optical head 34 may move in an unrestricted state to the limit of its movable range in this direction, and collide with the inner peripheral stopper 32A or the outer peripheral stopper 32B at the innermost peripheral location or outermost peripheral location, respectively. A problem at this point is that the constituent members of the optical head 34 or the places where it is joined are susceptible to being damaged.

To solve this problem, the structure aimed at preventing the tooth component 43 from coming out of the groove of the lead screw 38 has been disclosed in Japanese Laid-Open Patent Application 2000-339882, for example. This structure will now be described through reference to FIGS. 19 and 20.

In FIG. 19, 12 is a turntable on which a disk (not shown) is placed and fixed. The turntable 12 is rotationally driven by a spindle motor 11. The chucking member for fixing the disk is not shown in FIG. 19. 16 is an optical head for recording on or reproducing from a disk by emitting a light beam, 13 and 14 are guide shafts for guiding the optical head 16 in the radial direction of the disk placed on the turntable 12. 22A, 22B, 22C, and 22D are bearings that support the guide shafts 13 and 14. 17 is a movement motor that serves as a drive source for moving the optical head 16 in the radial direction of the disk placed on the turntable 12, 15 is a lead screw comprising a spiral groove provided around the axial peripheral face of a shaft thereof and which is rotated by the drive force of the movement motor 17, 18 is a power transmission member that engages with the lead screw 15 and transmits a propulsion force that moves the optical head 16 in the disk radial direction, and 19 is a chassis that integrally supports the above-mentioned members.

With the structure shown in FIG. 19, when the movement motor 17 is driven, it moves the head 16 in the disk radial direction, and recording or reproduction is performed at a specific radial position of the disk.

FIG. 20 is a diagram of a state in which the power transmission member 18 and the lead screw 15 have been engaged. The power transmission member 18 is made up of an engagement component 20 provided with a tooth component 20A that fits into a spiral groove 15A of the lead screw 15, and a limiting component 21 for preventing the tooth component 20A from coming out of the spiral groove 15A.

Providing the limiting component 21 avoids the problem in which the engagement component 20 is displaced perpendicularly to the movement direction and the tooth component 20A comes out of the spiral groove 15A when the head 16 is subjected to an excessive movement force caused by impact or the like in the movement direction. This makes it possible to prevent the power transmission member 18 from being in an unrestricted state in the movement direction. This also prevents a situation in which, if the head 16 should be subjected to an impact force in its movement direction, the head 16 moves in an unrestricted state up to the limit of its movable range in the movement direction, collide with the base member 10 itself or one of the parts that are constituted integrally with the base member 10, and the constituent members of the head 16, or places where it is joined, are subjected to damage.

Patent Document 1: Japanese Laid-Open Patent Application H10-74370

Patent Document 2: Japanese Laid-Open Patent Application 2000-339882

DISCLOSURE OF THE INVENTION

Problems Which the Invention is Intended to Solve

However, although the structure shown in FIGS. 19 and 20 does avoid the problem of the engagement component 20 coming out of the spiral groove 15A, it does not solve the problems arising from the collision of the optical head 16. Specifically, if the spiral advance angle A11 of the spiral groove 15A shown in FIG. 20 is large, then when an impact force F11 is applied, there will be little vertical resistance N11 as a reaction force from a component force F12 of the impact force F11, and this will result in a smaller frictional force R11, so there is the possibility that the tangential force F13, which is a component force of the impact force F11 in the groove face direction of the lead screw 15, may exceed this frictional force R11. If this happens, the lead screw 15 will be subjected to a force in the peripheral direction, that is, it will turn. Therefore, the optical head 16 cannot be stopped from moving in the direction of the impact force F11, and ends up moving all the way to the limit of its movable range, so in the end it is inevitable that it will collide with the base member 10 itself or one of the parts that are constituted integrally with the base member 10. The collision force produced during the collision here propagates directly to the optical head 16, so a problem is that it results in damage that directly affects performance, such as damage to the constituent parts inside the optical head 16, reduced positional precision between the constituent parts, etc.

It is an object of the present invention to solve the above problems encountered in the past and provide a power transmission member for a head movement mechanism, as well as a disk device equipped with the head movement mechanism, with which the collision force produced when an optical head is subjected to an impact force in its movement direction and collides with part of a base member, or part of a member fixed to the base member, is attenuated rather than directly propagating to the optical head, which makes it possible to lessen the damage to constituent parts.

Means Used to Solve the Above-Mentioned Problems

To achieve the stated object, the power transmission member of the present invention is a power transmission member of a mechanism for moving a head, used for recording on or reproducing from a disk, relative to a base member in a disk device, comprising a fixed component, a power transmission component, a linking component, and a contacting component. The fixed component is configured to be attached to the head. The power transmission component receives drive from a motor serving as a drive source. The linking component links the fixed component and the power transmission component. The contacting component is fixed to the power transmission component, and comes into contact with a contacted component that is part of the base member, or part of a member fixed to the base member, at least one end of the movement range of the head. This contacting component is linked to the fixed component in an elastic manner, and has a relative position being variable with respect to the fixed component in the movement direction of the head.

Further, to achieve the stated object, the disk device of the present invention comprises a disk rotation mechanism for rotating a disk capable of recording or reproduction, a head for recording on or reproducing from the disk, a head movement mechanism for moving the head in a radial direction of the disk, and a base member for integrally supporting the disk rotation mechanism, the head, and the head movement mechanism. The head movement mechanism has a power transmission mechanism that includes a power transmission member and transmits power to the head, and a motor that serves as a drive source of the power transmission mechanism. The power transmission member has a fixed component that is configured to be attached to the head, a power transmission component for receiving drive from the power transmission mechanism, a linking component for linking the fixed component and the power transmission component, and a contacting component that is fixed to the power transmission component, for coming into contact with part of the base member, or part of a member fixed to the base member, at least one end of the movement range of the head. This contacting component is linked to the fixed component via the linking component in an elastic manner, and has a relative position being variable with respect to the fixed component in the movement direction of the head.

EFFECT OF THE INVENTION

As described above, the power transmission member and disk device of the present invention offer the following advantageous effects. The head is forcibly moved upon being subjected to an impact force in the disk radial direction, and collides with part of the base member or the like, etc. at least one end of the movement range of the head. At this point, the kinetic energy produced by this movement is attenuated by the elastic deformation of the linking component between the fixed component and the contacting component, and this prevents the collision force from propagating directly to the head itself. As a result, this design avoids damage to the parts that make up the head and to the joints between the respective parts. This prevents deterioration in performance due, for example, to damage to the constituent parts inside the head, or reduced positional precision between the constituent parts, and therefore prevents a situation in which the disk device is unable to perform recording or reproduction. An additional effect of the power transmission member of the present invention is that the head is easier to position, and movement of the head produces less noise and vibration.

Also, with the power transmission member of the present invention, since the relative position of the contacting component is variable with respect to the fixed component in at least the movement direction of the head, even if the contacting component should collide with part of the base member, etc., within the movement range of the head, and subjected to the resulting reaction force, the reaction force will be attenuated before being transmitted to the power transmission component. Therefore, the reaction force to which the power transmission component is subjected is reduced, making it possible to avoid problems in the transmission configuration of the power transmission component.

Also, with the disk device of the present invention, the power transmission mechanism has a lead screw comprising a continuous spiral groove provided around the outer periphery of its cylindrical shaft. The power transmission component has a nut component at least part of which is provided with a rib capable of engaging with the continuous groove. This nut component is constituted integrally with the contacting component, and has a relative position being variable with respect to the head in at least the movement direction of the head. This makes the power transmission mechanism simpler and also increases transmission efficiency.

In this case, even if the contacting component should collide with part of the disk within the movement range of the head, and the resulting reaction force should be applied to the power transmission component, this force will be attenuated. Therefore, the engagement part of the rib can be prevented from coming out of the spiral continuous groove.

Figure 1:
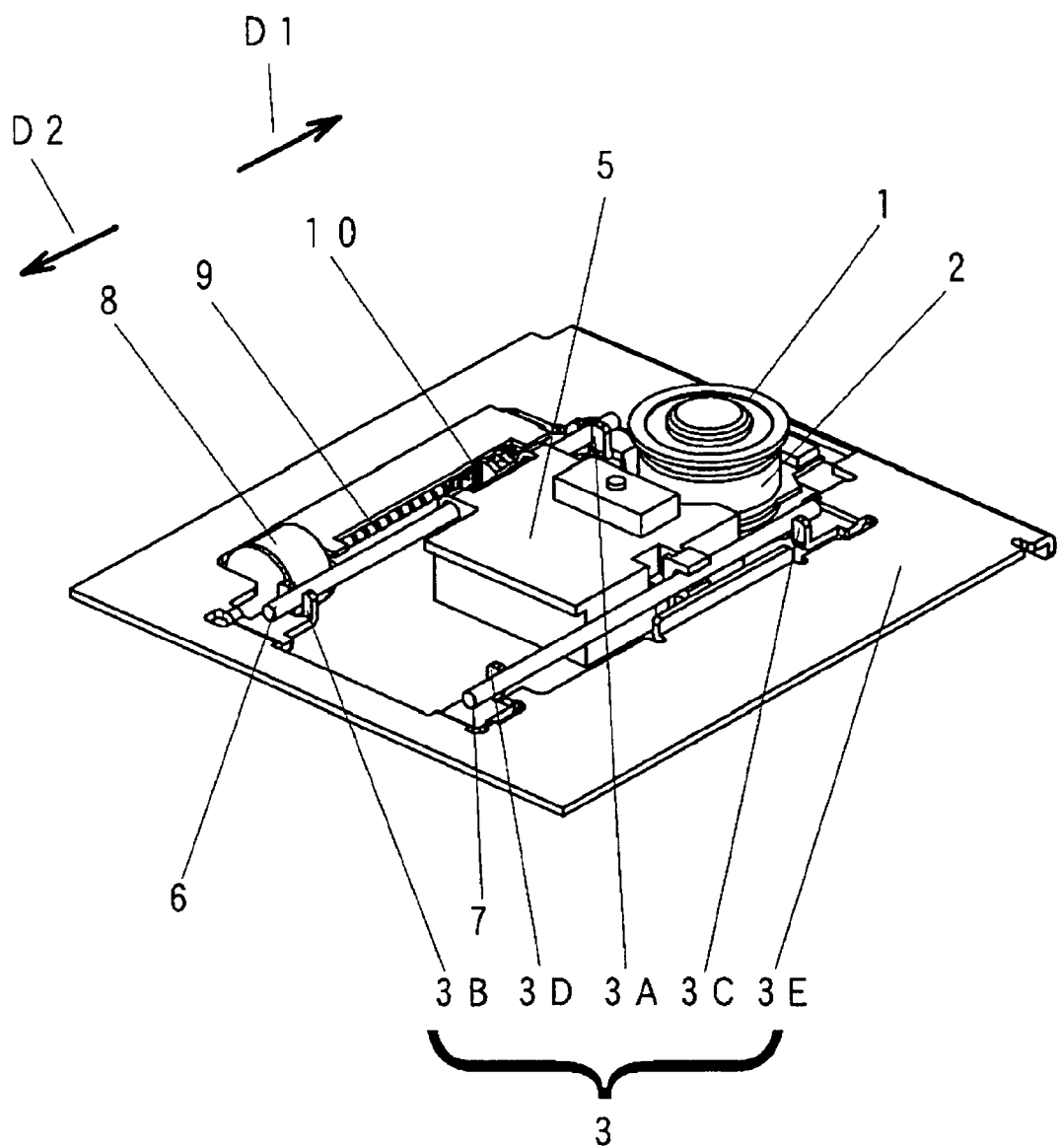
FIG. 1 is an oblique perspective view of the overall configuration of a head movement mechanism in a disk device of an embodiment of the present invention.

KEY 1 turntable
2 spindle motor
3 chassis
5 optical head
6 main guide shaft
7 secondary guide shaft
8 movement motor
9 lead screw
9A continuous groove
10 power transmission member
10A nut component
10B limiting component
10C nut support component
10D support column
10E support column
10F, 10G nut support component contact column
10H fixed side
10J, 10K fixed component contact column

BEST MODE FOR CARRYING OUT THE INVENTION

The concept behind the disk device in an embodiment of the present invention will now be described. The disk device in this embodiment is an optical disk device that records or reproduces information by emitting a light beam from an optical head onto an optical disk that is rotated by a rotation mechanism, and is generally constituted such that the optical head is guided and moved in a radial direction of the disk.

FIG. 1 is a simplified view of the configuration of the disk device in this embodiment. In FIG. 1, 1 is a turntable on which a disk (not shown) is placed and fixed, and is rotationally driven by a spindle motor 2. The spindle motor 2 is fixed and supported by a chassis 3. The disk and the chucking member for fixing the disk are not shown in FIG. 1. 5 refers to an optical head that emits a light beam. 6 and 7 refer to a main guide shaft and a secondary guide shaft, respectively, that guide the optical head 5 in the radial direction of the disk placed on the turntable 1. The main guide shaft 6 and secondary guide shaft 7 are each supported by bearings 3A, 3B, 3C, and 3D provided to a base face 3E of the chassis 3. 8 refers to a movement motor that serves as a drive source for moving the optical head 5 in the radial direction of the disk placed on the turntable 1, and 9 refers to a lead screw comprising a spiral continuous groove provided around the peripheral face of a shaft thereof, and which is rotated by a drive force obtained on the same axis as that of the movement motor 8. 10 refers to a power transmission member that engages with the lead screw 9 and transmits a propulsion force that moves the optical head 5 in the disk radial direction.

Figure 2:
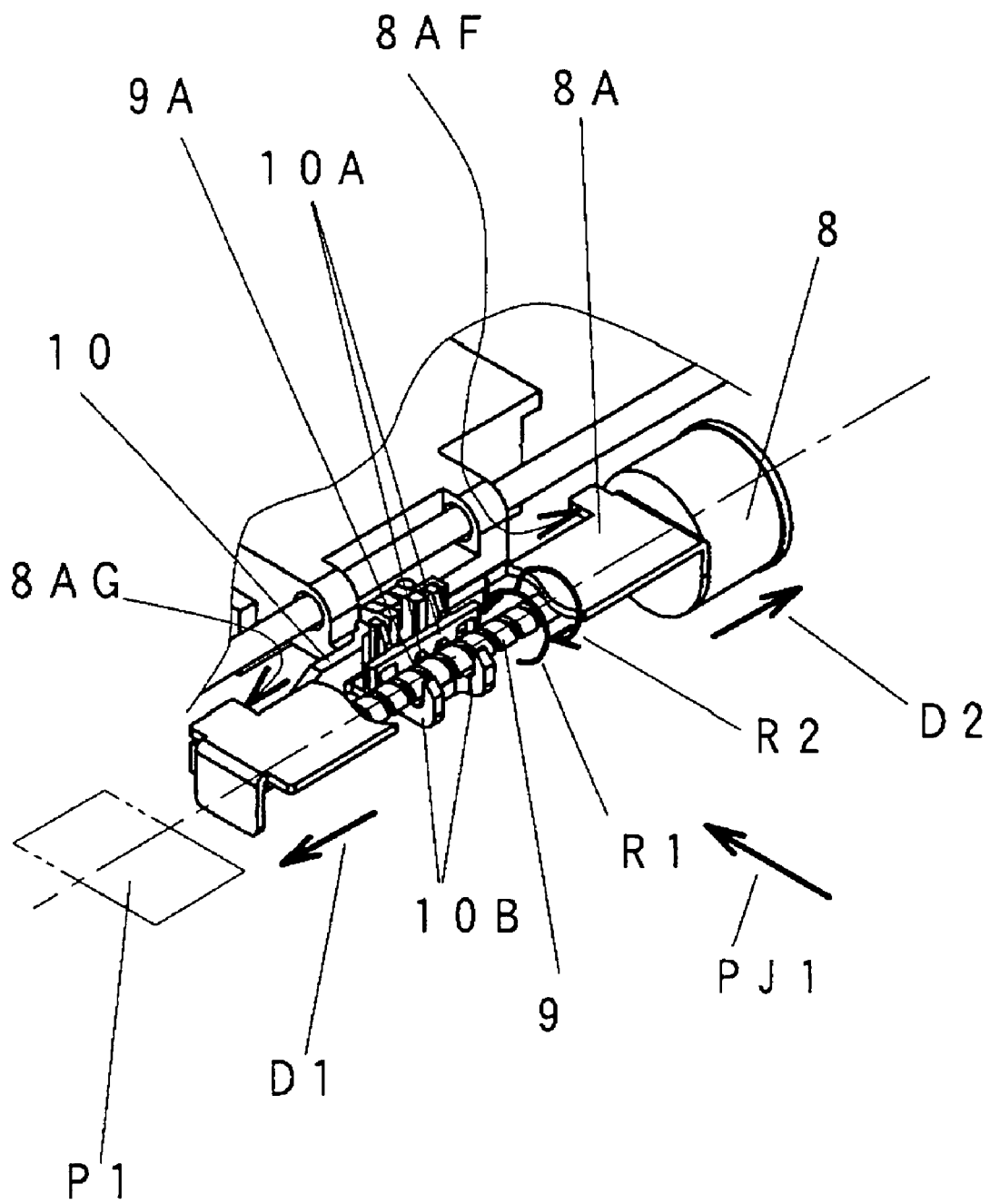
FIG. 2 is an oblique perspective view of details of the portion in which a power transmission member is driven by a lead screw in the disk device of the embodiment of the present invention.

FIG. 2 is a detail view of a state in which the power transmission member 10 is engaged with the lead screw 9. In FIG. 2, 8A refers to a motor bracket provided to the movement motor 8, for fixing and supporting the movement motor 8 to the chassis 3. 9A refers to a spiral continuous groove provided to the lead screw 9. 10A refers to a nut component provided to the power transmission member 10, and is part of a spiral rib that fits into and engages with the continuous groove 9A. In this embodiment, the spiral direction of the continuous groove 9A is that of a right-hand thread.

10B refers to a limiting component that prevents the nut component 10A from coming out of the spiral continuous groove 9A. The function of this limiting component 10B will now be described.

Figure 3:
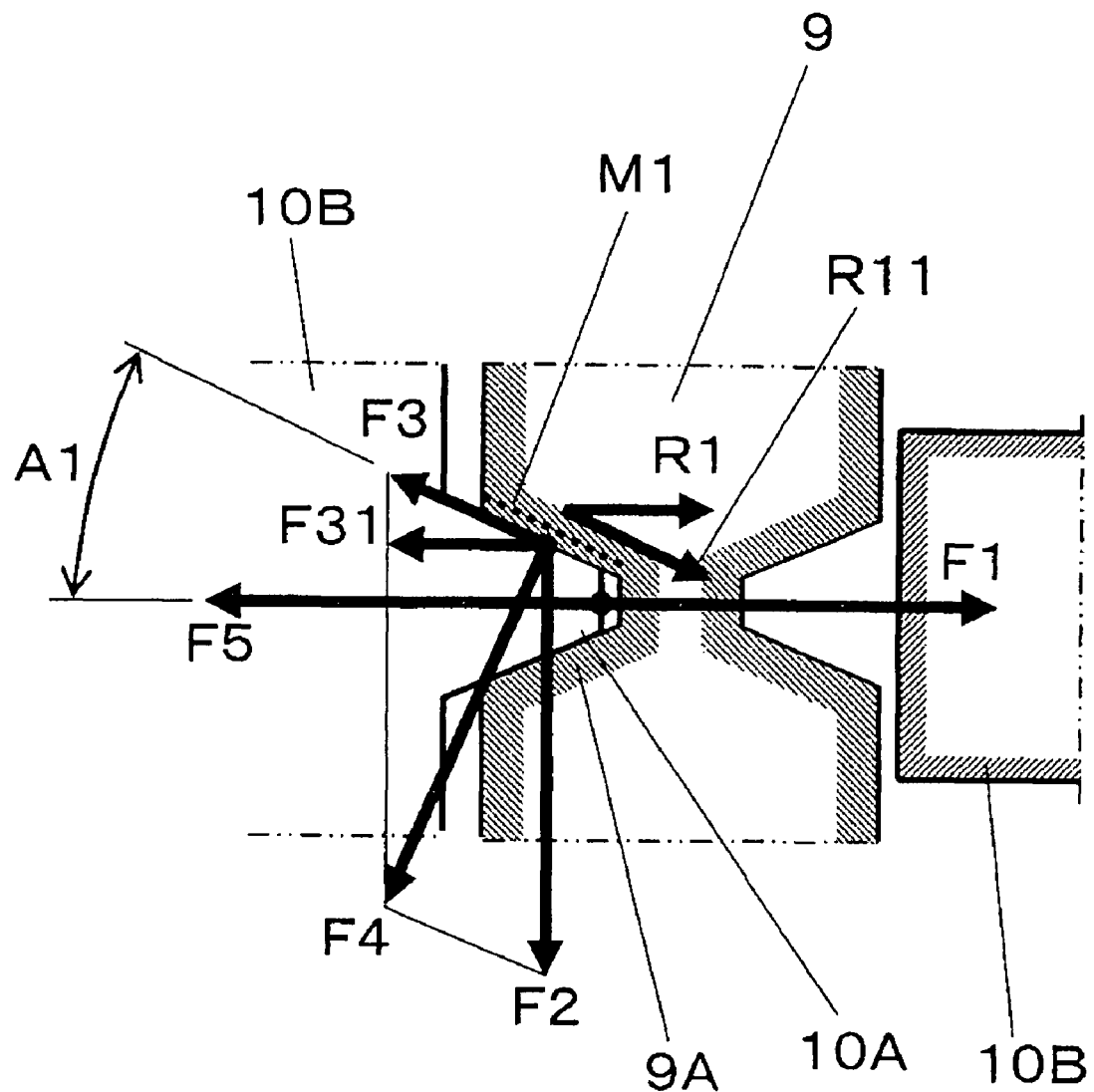
FIG. 3 is a cross section of a state in which the lead screw and a nut component are engaged in the disk device of the embodiment of the present invention.

FIG. 3 is a cross section along the plane P1 in FIG. 2. This plane P1 is an imaginary plane that includes the axis of the movement motor 8 and the lead screw 9, and is parallel to the side of the turntable 1 where the disk is placed in FIG. 1.

As shown in FIG. 3, the continuous groove 9A and the nut component 10A each have a trapezoidal cross section whose sloped sides form an angle A1, and the sloped sides of the trapezoids are in contact with each other. Also, the nut component 10A is pushed by a pushing force F1 into the continuous groove 9A. When the lead screw 9 turns in the direction of the arrow R1 in FIG. 2, because the continuous groove 9A is a right-hand thread, a propulsion force F2 is generated in the continuous groove 9A. If we use the lead screw 9 as a reference, the propulsion force F2 is broken down into a horizontal force F3 and a vertical force F4 that act on the nut component 10A. If we let M1 be the coefficient of friction at the interface between the continuous groove 9A and the nut component 10A here, then the frictional force R11 in the direction parallel to the horizontal force F3 is expressed by Equation 1 below.

$$R11 = M1 \cdot F4 \quad \text{(Equation 1)}$$

Here, F4 is expressed by the following Equation 2.

$$F4 = F2 \cos(A1) \quad \text{(Equation 2)}$$

Therefore, Equation 1 is expressed by the following Equation 3.

$$R11 = M1 \cdot F2 \cos(A1) \quad \text{(Equation 3)}$$

F3 is expressed by the following Equation 4.

$$F3 = F2 \sin(A1) \quad \text{(Equation 4)}$$

The force F5 acting in the direction in which the nut component 10A comes out of the continuous groove 9A here is expressed by the following Equation 5 from Equations 3 and 4, as the combined force of the component force F31 (Equation 1) from the horizontal force F3 in FIG. 3 and the component force R1 from the frictional force R11.

$$\begin{aligned} F5 &= F31 - R1 \\ &= F3\cos(A1) - R11\cos(A1) \\ &= F2\{\sin(A1) - M1\cos(A1)\}\cos(A1) \end{aligned} \quad \text{(Equation 5)}$$

M1 is a value less than 1, and A1 is 90 degrees or less, so the right side in Equation 5 is always a positive number.

Therefore, to keep the nut component 10A from coming out of the continuous groove 9A, the relation expressed by the following Equation 6 must be satisfied.

$$F1 > F5 = F2\{\sin(A1) - M1\cos(A1)\}\cos(A1) \quad \text{(Equation 6)}$$

Because of Equation 6, to keep the nut component from coming out, either the pushing force F1 must be increased, or the frictional force M1 must be increased.

However, when either of these is increased, there is greater frictional force at the interface between the nut component 10A and the continuous groove 9A. In this case, the sliding load between the two increases, so this leads to adverse effects such as an increase in the rotational load of the movement motor 8, or accelerated wear at the interface.

In view of this, if the limiting component 10B is provided, then even if the nut component 10A should be subjected to a force in the direction in which it would come out of the continuous groove 9A, the side of the continuous groove 9A opposite the nut component 10A will be limited, preventing the nut component 10A from coming out.

This holds true not only when the propulsion force F2 from the continuous groove 9A is applied to the nut component 10A, but also when a force is applied from the nut component 10A to the continuous groove 9A. For example, this corresponds to a situation in which an excessive external force is applied in the movement direction of the optical head 5 in a state in which no drive force is being generated in the lead screw 9.

A situation in which an external force is applied in the movement direction of the optical head 5 in a state in which no drive force is being generated in the lead screw 9 will now be described through reference to FIG. 4.

Figure 4:
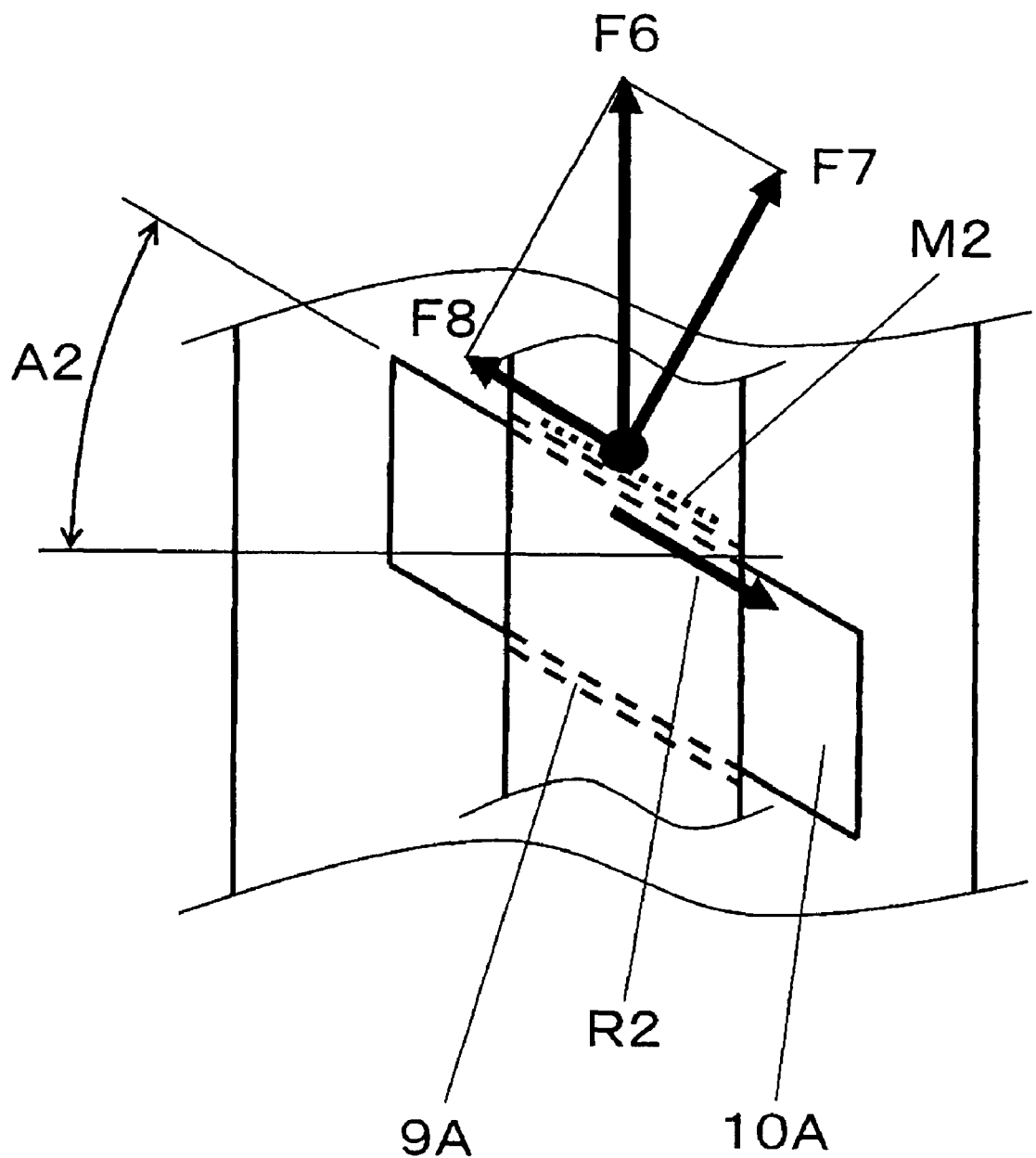
FIG. 4 is a diagram of the relationship of engagement between the lead screw and the nut component in the disk device of the embodiment of the present invention.

FIG. 4 is a schematic transparent view of the limiting state of the nut component 10A and the continuous groove 9A, as seen in the direction of the arrow PJ in FIG. 2. The nut component 10A and the continuous groove 9A both have an advance angle A2. The coefficient of friction at the interface between the two is M2.

At this point, if an external force F6 is applied in the direction D1 in FIG. 2 to the nut component 10A in a state in which no drive force is being generated in the lead screw 9, a vertical force F7 and a horizontal force F8 are generated at the interface as component forces of F6. At the same time, the frictional force R2 shown in Equation 7, below is generated at this interface.

$$R2 = M2 \cdot F7 \quad \text{(Equation 7)}$$

F7 here is expressed by the following Equation 8.

$$F7 = F6\cos(A2) \quad \text{(Equation 8)}$$

Therefore, R2 is expressed by the following Equation 9.

$$R2 = M2 \cdot F6 \cos(A2) \quad \text{(Equation 9)}$$

Also, F8 is expressed by the following Equation 10.

$$F8 = F6\sin(A2) \quad \text{(Equation 10)}$$

At this point, if the horizontal force F8 is greater than the frictional force R2, slippage will occur at this interface, that is, the lead screw 9 will be forcibly rotated. This condition is expressed by the following Equation 11.

$$F8 > R2 \quad \text{(Equation 11)}$$

Based on Equations 9 to 11, we obtain the following Equation 12.

$$F6 \sin(A2) > M2 \cdot F6 \cos(A2) \quad \text{(Equation 12)}$$

This can be rewritten as in the following Equation 13.

$$M2 < \tan(A2) \quad \text{(Equation 13)}$$

Whether or not this condition is met is determined by the value of the coefficient of friction M2 and the advance angle A2. That is, the result will vary with the combination of materials of the lead screw 9 and the nut component 10A, and the setting of the advance angle A2. For example, when the coefficient of friction M2 is 0.2 and the advance angle A2 is 15 degrees, the right side of Equation 13 is 0.27, and the condition is met.

"No drive force is generated in the lead screw 9" is a state in which it is assumed, for example, that there is no cogging or other static holding force present in the movement motor 8.

Under this condition, when, for example, the disk device of this embodiment has been dropped in the direction of the arrow D1 in FIG. 1 and hit the ground, most of the momentum attributable to the velocity just prior to the collision propagates to the head 5, and the head 5 is forcibly moved with this momentum in the direction of the arrow D1. Here, the position of at least the head 5 prior to being dropped is separated by a gap from the chassis 3 or some other member held integrally with the chassis 3. The only thing limiting the head 5 from going in the movement direction at this point is the frictional force at the interface between the nut component 10A and the continuous groove 9A.

With the momentum generated at the highest velocity attained by acceleration produced in this forcible movement, the head 5 collides with the chassis 3 itself, or with some other member held integrally with the chassis 3, at the limit to the movement range of the head 5. This collision causes most of the momentum had by the head 5 to work as an impact force against the head 5, the chassis 3 or another member thereof, and mainly results in deformation of the member, damage to connected portions, or the like.

In view of this, if the above-mentioned momentum could be reduced, it would be possible to avoid the deformation of members, damage to connected portions, and so forth. To this end, it is effective to stop the head 5 that has been forcibly moved, while lessening the impact at the movement range limit.

A configuration for stopping the head 5 that has been forcibly moved while lessening the impact at the movement range limit, when, as a result of the disk device of this embodiment being dropped and colliding with the ground, most of the momentum attributable to the velocity just prior to the collision is transmitted to the head 5, will now be described through reference to FIGS. 2 and 5.

Figure 5:
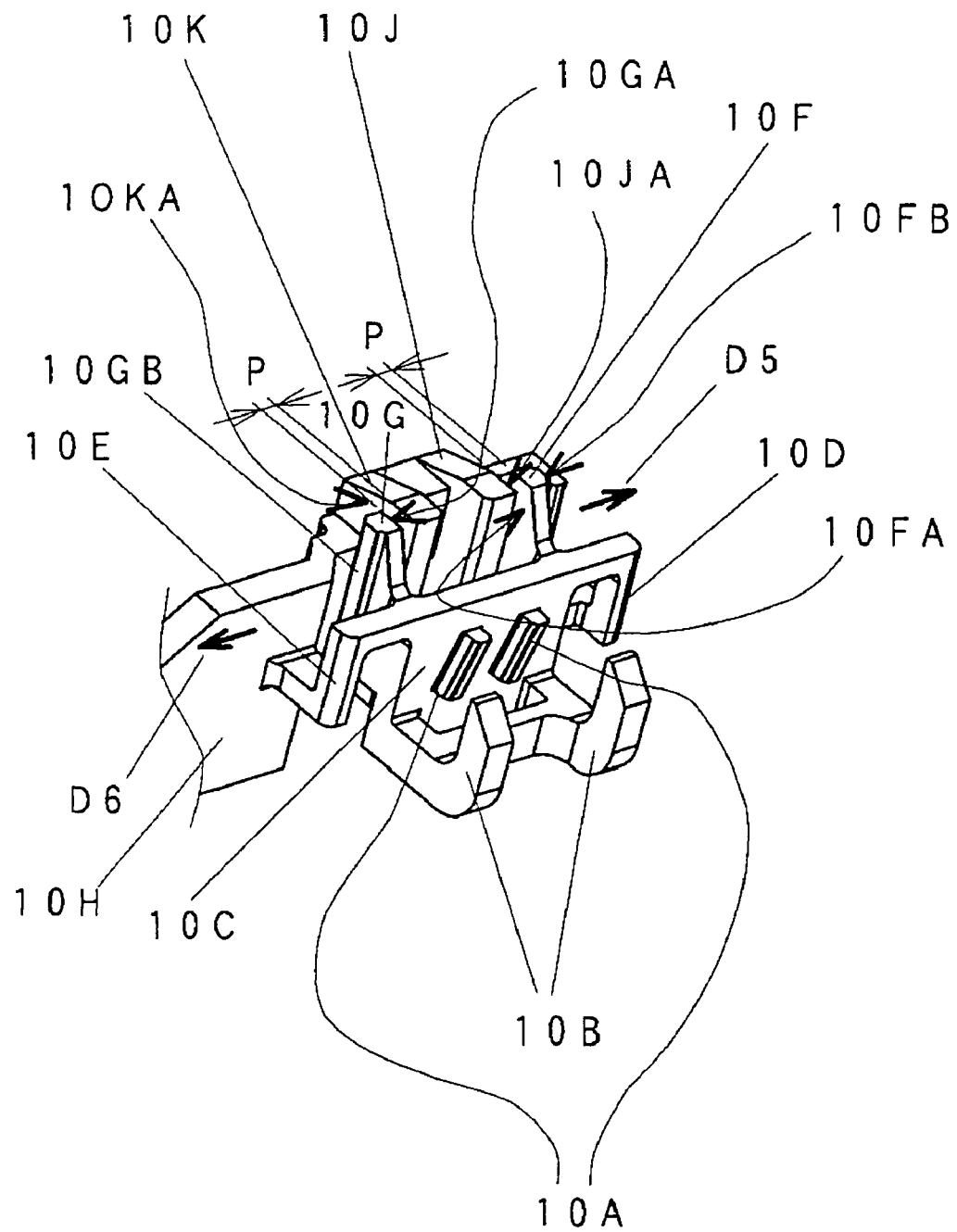
FIG. 5 is a diagram of the detailed configuration of the power transmission member in the disk device of the embodiment of the present invention.

FIG. 5 is a detail view of the structure of the power transmission member 10. In FIG. 5, 10C refers to a nut support component for integrally supporting the nut component 10A and the limiting component 10B. The nut support component 10C is supported by support columns 10D and 10E, and is able, through the bending of the support columns 10D and 10E, to pivot in the arrow D5 direction or the arrow D6 direction. A nut support component contact column 10F and a nut support component contact column 10G are integrally provided to the nut support component 10C. A fixed component contact column 10J and a fixed component contact column 10K are integrally provided to the side 10H of the power transmission member 10 which is fixed to the head 5. The nut support component contact column 10F and the nut support component contact column 10G have a nut-side contact face 10FA and a nut-side contact face 10GA, respectively, and the fixed component contact column 10J and the fixed component contact column 10K have a fixed-side contact face 10JA and a fixed-side contact face 10KA, respectively. The nut-side contact face 10FA and the nut-side contact face 10GA, and the fixed-side contact face 10JA and the fixed-side contact face 10KA are respectively across from each other with a gap P in between.

With the structure described above, when the head 5 is forcibly moved in the arrow D1 direction or the arrow D2 direction in FIG. 1, first a nut-side contact face 10FB or a nut-side contact face 10GB, which is a back side of the nut-side contact face 10FA or the nut-side contact face 10GA of the nut support component contact column 10F or the nut support component contact column 10G, comes into contact with a contact face 8AF or 8AG of the motor bracket 8A in FIG. 2, and the movement range limit is reached.

Since at this point the kinetic energy produced by the movement of the head 5 has still not been attenuated, the head 5 is subjected to an inertial force that carries it in its direction of movement. This inertial force causes the nut support component 10C to pivot backward away from the movement with respect to the fixed side 10H. At this point, the kinetic energy here is attenuated by being converted into the elastic energy required to bend the support column 10D and the support column 10E.

After further movement by remaining kinetic energy that has not been converted into elastic energy, the nut-side contact face 10FA or the nut-side contact face 10 GA hits the fixed-side contact face 10JA or the fixed-side contact face 10KA, and the movement of the head 5 comes to a halt.

The amount of kinetic energy that is converted at this time depends on the spring constant of the support column 10D or the support column 10E, and the larger is the spring constant, the greater is this amount of energy, but there is also greater impact force produced by the reaction from the spring force caused by backward bending. Accordingly, the spring constant is preferably optimized by taking into account the magnitude of impact, the weight of the head 5, the value of the gap P, and so forth.

Thus optimizing the support column 10D and support column 10E and attenuating the forcible movement of the head 5 causes the kinetic energy had by the head 5 to work on the head 5, the chassis 3, or another member, which prevents the deformation of members, damage to connected portions, or the like.

The condition for converting all of the kinetic energy produced by the movement of the head 5 into elastic energy for bending the support column 10D and support column 10E is expressed by the following Equation 14, where Mh is a mass of the head 5, Vh is the velocity of the head 5 just before the nut-side contact face 10FA or the nut-side contact face 10GA comes into contact with the fixed-side contact face 10JA or the fixed-side contact face 10KA, respectively, and Ks is the combined spring constant of the support column 10D and support column 10E.

$$(½)·Mh·Vh2<(½)·Ks·P2 \quad \text{(Equation 14)}$$

However, if the condition of Equation 14 is not met, such as when the gap P cannot be made large enough, or when the relationship of the constituent materials imposes a limit to the combined spring constant Ks, it may be impossible to completely eliminate the above-mentioned kinetic energy when the nut-side contact face 10FA or the nut-side contact face 10 GA comes into contact with the fixed-side contact face 10JA or the fixed-side contact face 10KA, respectively.

Therefore, after the two have come into contact, just the fixed side 10H and the portion constituted integrally therewith (including the head 5) rebound and begin forcible movement in the opposite direction from that of the initial movement, corresponding to the remaining kinetic energy. The nut support component 10C is stationary at this time until the bending of the support column 10D and support column 10E has been released.

In the forcible movement of the head 5, as already described above, if the condition of Equation 13 has been met, the lead screw 9 is also forcibly rotated, but if the head 5 is forcibly moved in the opposite direction from its initial movement, then the lead screw 9 also rotates in the opposite direction. This imparts rotational inertia to the lead screw 9, and the nut component 10A is subjected to a force in the direction in which it comes out of the continuous groove 9A.

As described above, when the limiting component 10B subjects the nut component 10A to a force in the direction in which it would come out of the continuous groove 9A as shown in FIG. 3, the movement is limited on the side of the continuous groove 9A across from the nut component 10A, but when the force F5 acting in the direction in which the nut component 10A comes out of the continuous groove 9A is larger than the limiting force of the limiting component 10B, the nut component 10A is again displaced in the direction in which it would come out of the continuous groove 9A.

Situations in which the limiting force of the limiting component 10B is less than the force F5 acting in the direction in which the nut component 10A comes out of the continuous groove 9A include when the limiting component 10B is damaged because its breaking strength cannot withstand F5, so no limiting force at all is generated, and when the elastic strength of the limiting component 10B is less than F5. In the former case, since there is no limiting force after the damage, the nut component 10A cannot be prevented from coming out of the continuous groove 9A. In the latter case, the nut component 10A again cannot be prevented from coming out of the continuous groove 9A unless the elastic strength of the limiting component 10B is greater than F5 in the region of displacement required for the nut component 10A to come out of the continuous groove 9A.

Thus, when an impact force causes the head 5 to move backward from its initial movement, and the lead screw 9 is forcibly rotated, the impact imparts excessive rotational inertia, so the elastic strength and breaking strength of the limiting component 10B must be increased in order to avoid this, but if F5 is large enough to exceed this strength, then it will be impossible to avoid a situation in which the nut component 10A comes out of the continuous groove 9A. Depending on how the force is received during the impact, the nut component 10A or the lead screw 9 may deform or break, causing the nut component 10A to come out of the continuous groove 9A. Furthermore, if the nut component 10A does come out of the continuous groove 9A, the lead screw 9 will be unable to impart a movement propulsion force to the power transmission member 10. Specifically, it will be impossible to move the head 5, and the device will not function as an optical disk device.

To avoid this problem, it is effective to provide a structure in which the force of forcible movement exerted on the nut support component 10C is attenuated even when at least the head 5 has been subjected to an impact and then rebounded and forcibly moved in the opposite direction from its initial movement.

With the disk device of this embodiment, as described above, after the head 5 has been subjected to an impact and the nut-side contact face 10FA or the nut-side contact face 10 GA has come into contact with the fixed-side contact face 10JA or the fixed-side contact face 10KA, respectively, the nut support component 10C is stationary with no force propagating to the nut support component, until the bending of the support column 10D and support column 10E is released. Specifically, there is a delay from the time when the head 5 is subjected to an impact until the nut support component 10C is subjected to movement force in the opposite direction from its initial movement. The movement force that propagates to the nut support component 10C in the opposite direction from the initial movement can be attenuated by the time until the bending of the support column 10D and support column 10E is released during this period.

Next, the characteristic structure of the power transmission member 10 in this embodiment, and the action thereof, will be described while comparing them to those of a power transmission member in a typical, conventional configuration.

Figure 9:
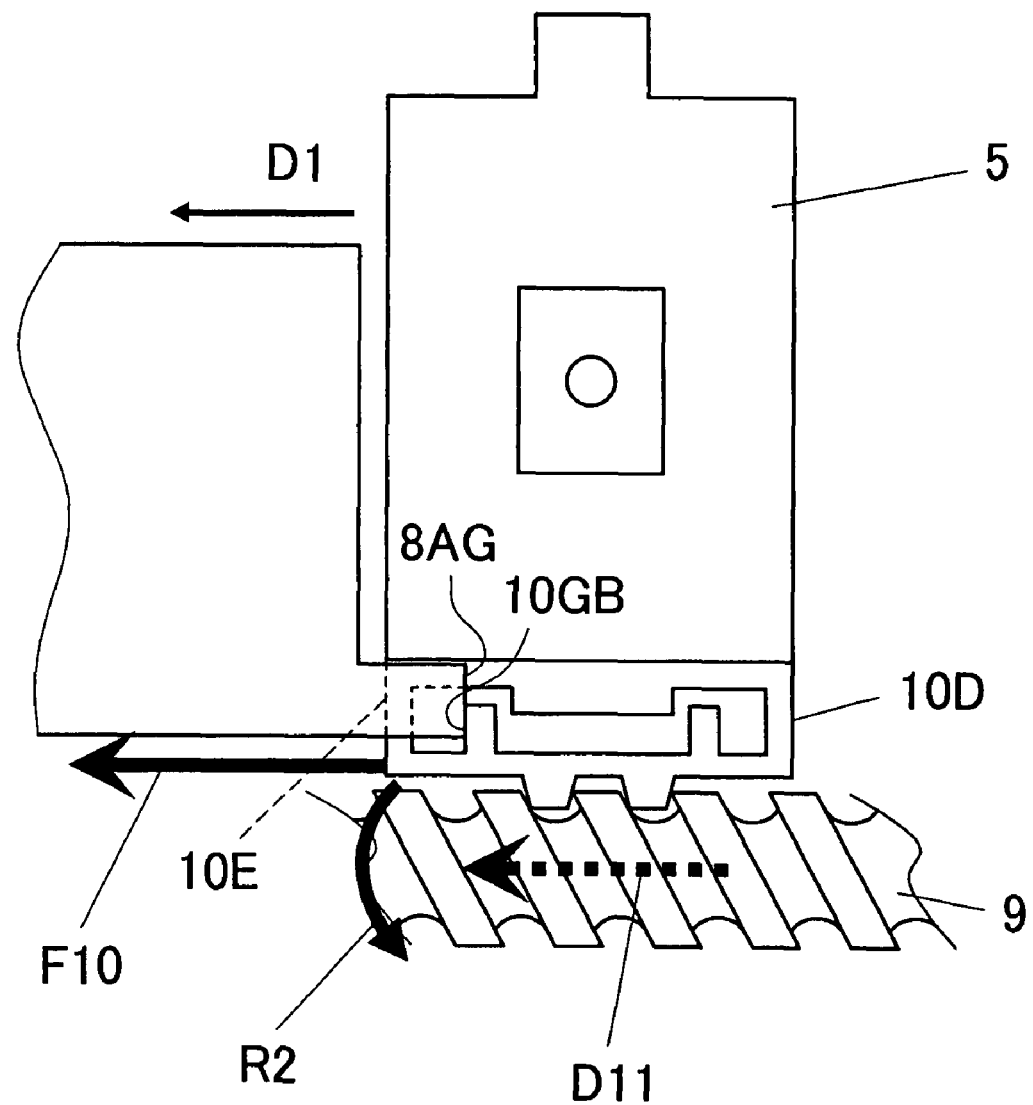
FIG. 9 is a schematic representation of the operation of the power transmission member of the present invention during the collision of the head.
Figure 10:
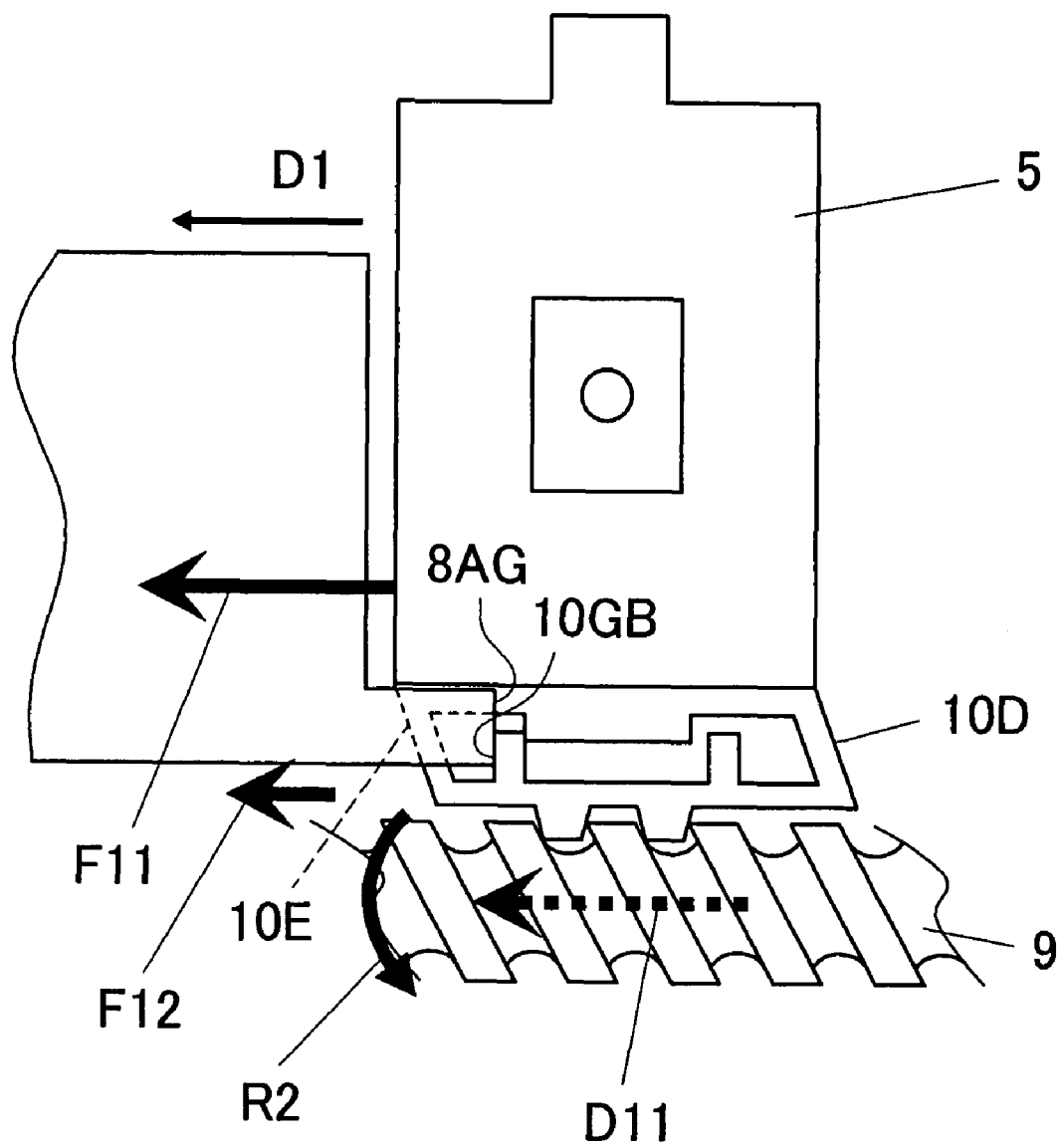
FIG. 10 is a schematic representation of the operation of the power transmission member of the present invention during the collision of the head.
Figure 11:
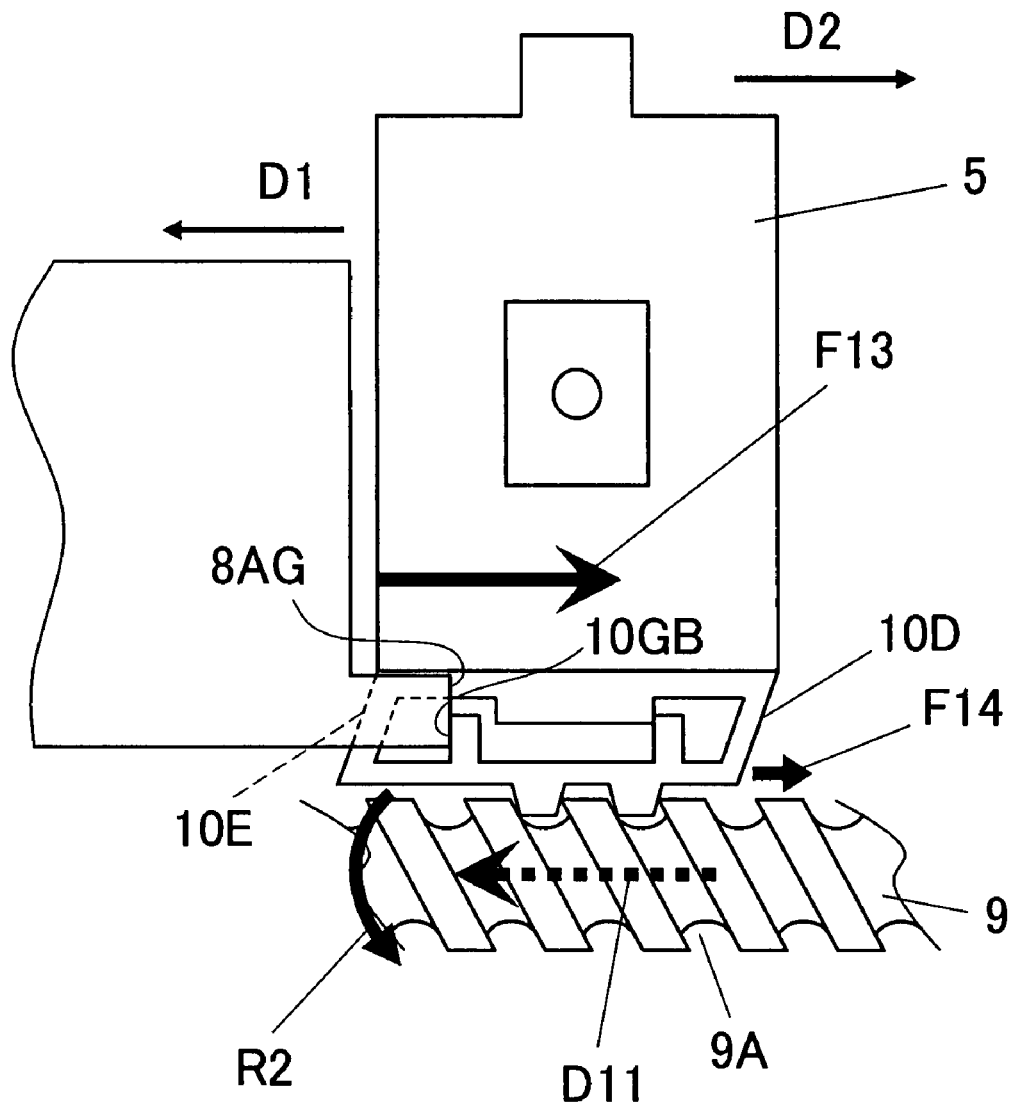
FIG. 11 is a schematic representation of the operation of the power transmission member of the present invention during the collision of the head.

FIGS. 9 to 11 are embodiments having a configuration that allows an impact to be lessened as the head 5 is stopped when the head 5 has been forcibly moved in the arrow D1 direction, reaches its movement range limit, and collides with the chassis 3 itself or some member that is supported integrally with the chassis 3. These drawings schematically illustrate the relationship between the contact face 8AG and the head 5, the power transmission member 10, and the lead screw 9. FIGS. 12 to 15 illustrate conventional configurations for the sake of comparison with this embodiment.

FIG. 9 shows the state when the head 5 has been forcibly moved in the arrow D1 direction, and the nut-side contact face 10GB is in contact with the contact face 8AG. The nut component 10A, which is part of the power transmission member 10, stops its displacement with respect to the contact face 8AG at this stage.

Meanwhile, when the lead screw 9 rotates in the direction of the arrow R2, it generates a movement force in the arrow D1 direction of the head 5. Therefore, when the head 5 is forcibly moved in the arrow D1 direction by another external force, the lead screw 9 is forcibly rotated in the arrow R2 direction, and the inertia from this rotation remains even at the stage shown in FIG. 9, so the rotational force itself continues.

Also, since the nut component 10A and the fixed side 10H in the power transmission member 10 are configured so as to be able to be forcibly displaced by the support columns 10D and 10E, the head 5 itself is also capable of being displaced with respect to the nut component 10A in an elastic manner. Accordingly, even if the nut-side contact face 10GB comes into contact with the contact face 8AG, the movement of the head 5 itself will continue under the inertia of the force remaining in the arrow D1 direction. A force F10 is acting on the head 5 and the power transmission member 10 at this time.

FIG. 10 illustrates the state immediately after the state shown in FIG. 9, in which the head 5 has elastically deformed the support columns 10D and 10E by its inertia. At this stage, the elastic deformation of the support columns 10D and 10E disperses the force F10 by splitting in by weight ratio between the head 5 and the nut component 10A, with the force F11 acting on the head 5 and F12, which is smaller than F11, acting on the nut component 10A. Also, the rotational force in the arrow R2 direction acting on the lead screw 9 continues.

FIG. 11 illustrates the state immediately after the state shown in FIG. 10, in which the head 5 has returned in the arrow D2 direction by rebound produced by the elastic strength of the support columns 10D and 10E. The nut-side contact face 10GB remains in contact with the contact face 8AG at this time. At this stage, the head 5 and the nut component 10A are subject to forces F13 and F14, which are rebound of F11 and F12, and whose severity is substantially equivalent to the result of F11 and F12 being attenuated somewhat, work in the arrow D2 direction.

The rotational force in the arrow R2 direction acting on the lead screw 9 continues at this time as well. This rotational force acts as a force to move the head 5 in the arrow D11 direction, while the nut component 10A is subject to a force in the direction in which it is forcibly moved by the force F14 in the arrow D2 direction, which is the opposite direction, so these forces act as mutually opposing forces. Accordingly, the nut component 10A is subject to a force that would make it come out of the continuous groove 9A, but as shown in FIG. 11, the force F14 is sufficiently smaller than the force F13, so the nut component 10A does not end up coming out.

Figure 12:
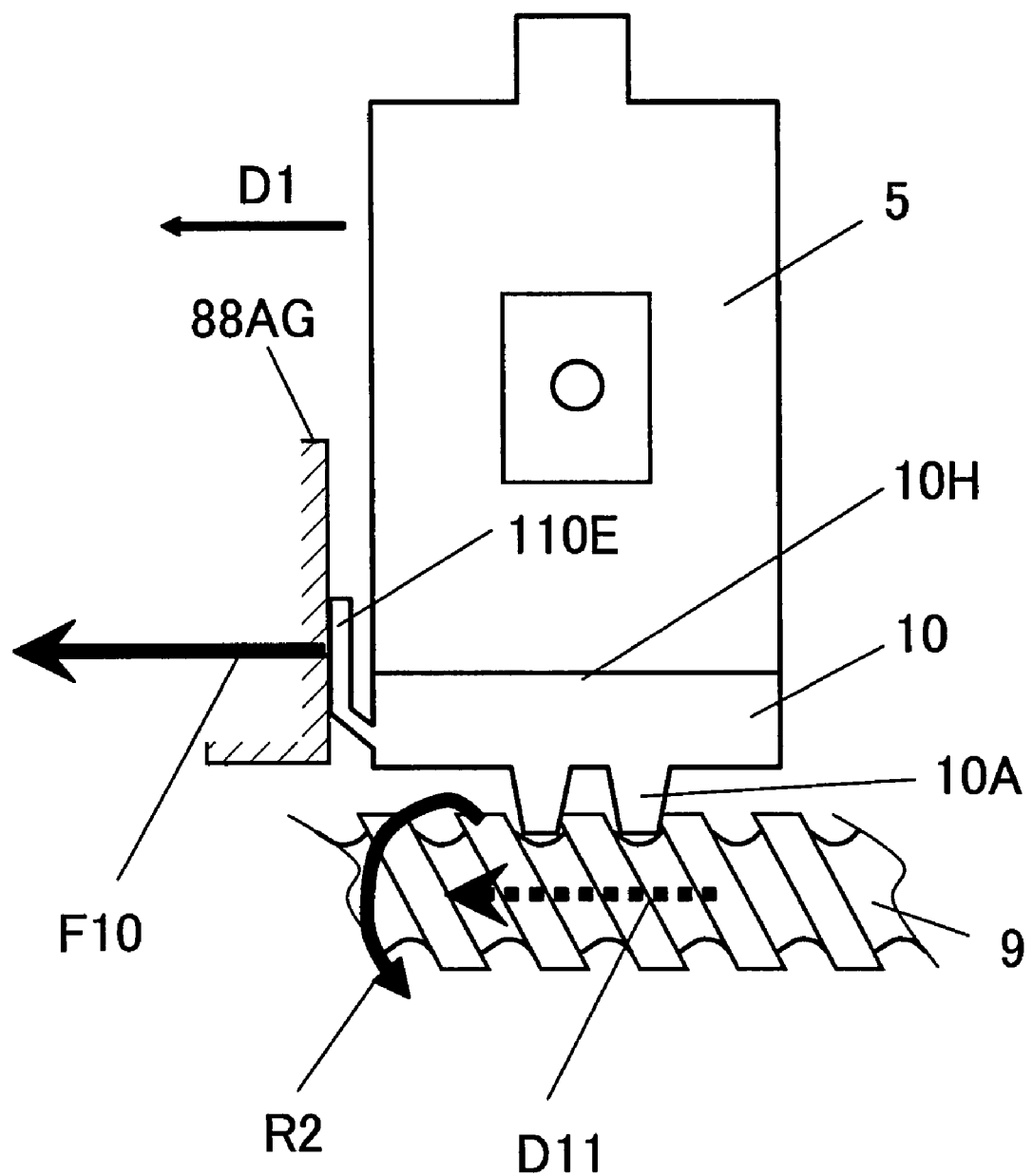
FIG. 12 is a schematic representation of the operation of a conventional power transmission member during the collision of the head.
Figure 13:
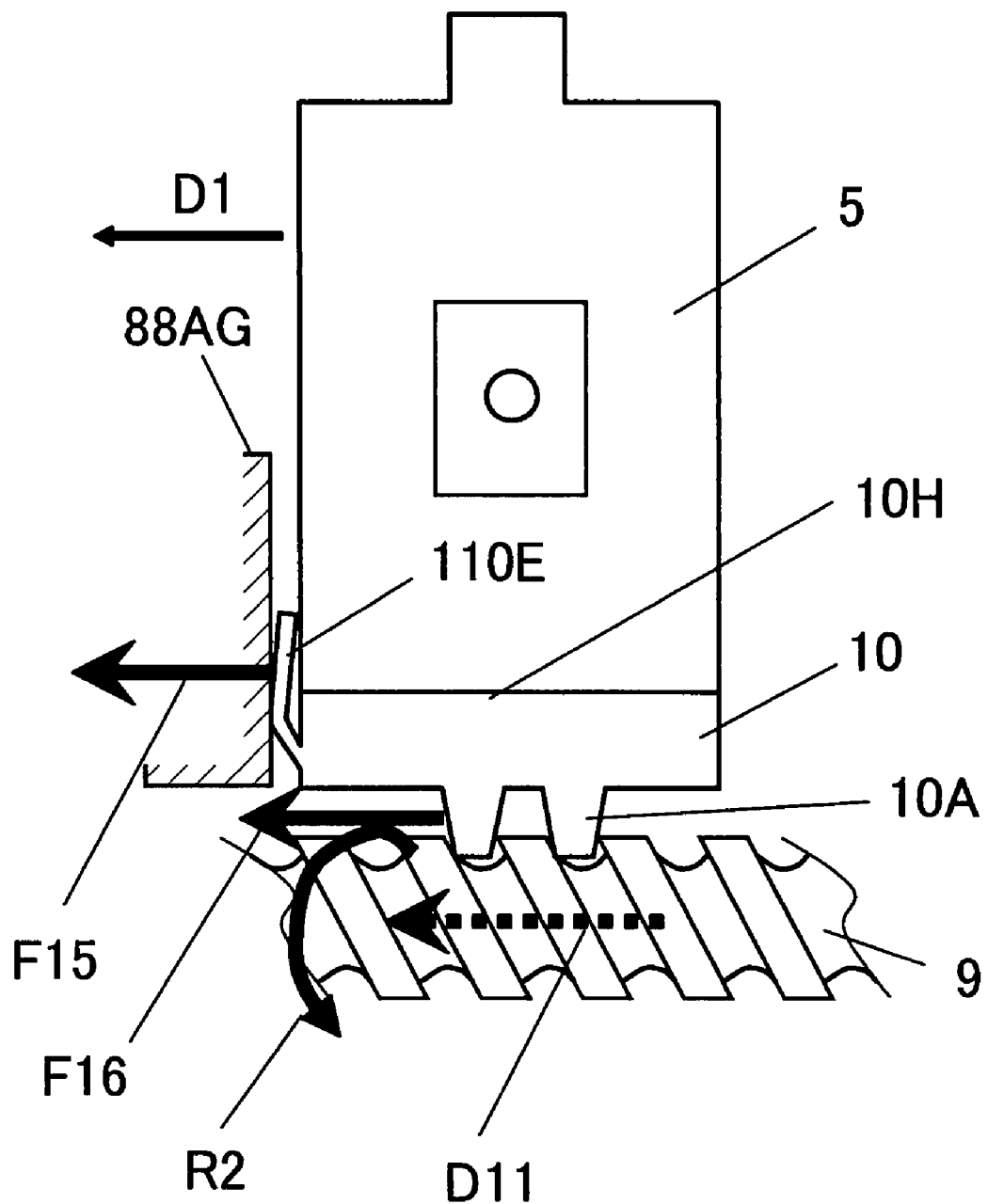
FIG. 13 is a schematic representation of the operation of the conventional power transmission member during the collision of the head.
Figure 14:
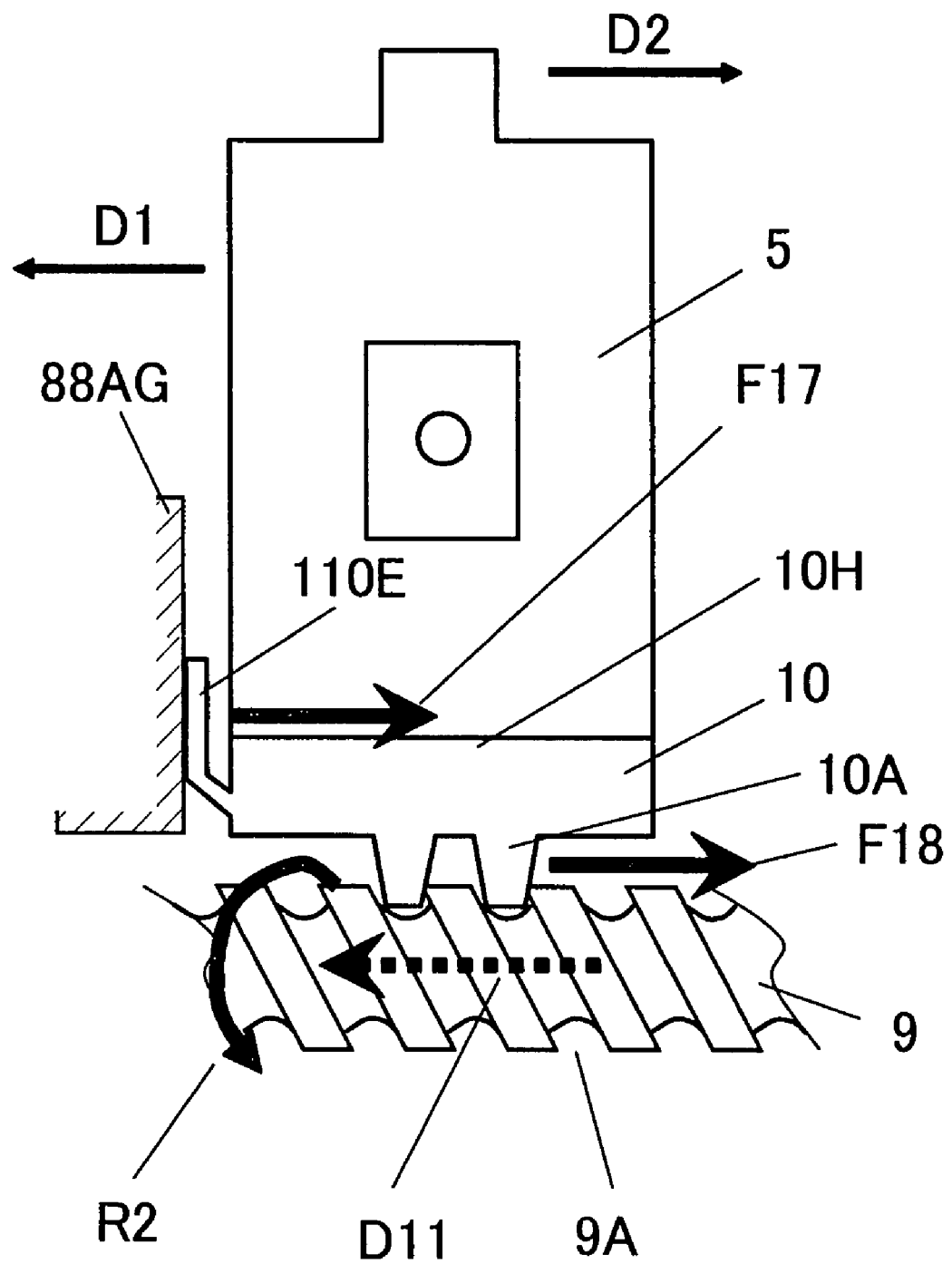
FIG. 14 is a schematic representation of the operation of the conventional power transmission member during the collision of the head.

Meanwhile, with the conventional configuration shown in FIGS. 12 to 14, the basic structure of the head 5, the power transmission member 10, the lead screw 9, and the contact face 8A is substantially the same as that in the case of FIGS. 9 to 11, but the structure of the power transmission member 10 is different.

The difference between the structure of this embodiment shown in FIGS. 9 to 11 and the structure shown in FIGS. 12 to 14 is that the power transmission member 10 in the former has the function of lessening the impact of collision when the head 5 is forcibly moved. With the structure in this embodiment, the impact is absorbed by the support columns 10D and 10E, but with the structure shown in FIGS. 12 to 14, it is absorbed by the elasticity of the cushioning spring component 110E. This action will now be described.

In FIGS. 12 to 14, the power transmission member 10 is constituted such that the nut component 10A and the fixed side 10H are in a rigid state. Also, the cushioning spring component 110E is provided to the face of the power transmission member 10 that is across from the contact face 88AG on the arrow D1 side.

FIG. 12 illustrates a state in which the head 5 has been forcibly moved in the arrow D1 direction, and the cushioning spring component 1110E is in contact with the contact face 88AG. Displacement of the power transmission member 10 with respect to the contact face 8AG stops at this stage. Meanwhile, the lead screw 9 rotates in the arrow R2 direction and generates a force that moves the head 5 in the arrow D11 direction, so when the head 5 is forcibly moved by another external force in the arrow D1 direction, the lead screw 9 is forcibly rotated in the arrow R2 direction, and the inertia from this rotation remains even at the stage shown in FIG. 12, so the rotational force itself continues. Also, since the power transmission member 10 is configured so as to be able to be displaced by the cushioning spring component 110E in an elastic manner, the head 5 itself is also capable of being elastically displaced with respect to the contact face 88AG. Accordingly, even if the cushioning spring component 110E comes into contact with the contact face 88AG, the movement of the head 5 itself will continue under the inertia of the force remaining in the arrow D1 direction. A force F10 is acting on the head 5 and the power transmission member 10 at this time. This force is the same as F10 in FIG. 9.

FIG. 13 illustrates the state immediately after the state shown in FIG. 12, in which the head 5 has elastically deformed the cushioning spring component 110E by its inertia. The force F10 at this stage is split so that F15 acts on the head 5 and F16 on the nut component 10A, but because the nut component 10A is rigid with respect to the fixed side 10H, the result is that the force F15 acting on the head 5 is equivalent to the force F16 acting on the nut component 10A. Also, the rotational force in the arrow R2 direction acting on the lead screw 9 continues.

FIG. 14 illustrates the state immediately after the state shown in FIG. 13, in which the head 5 has returned in the arrow D2 direction by rebound produced by the elastic strength of the cushioning spring component 110E. The cushioning spring component 110E remains in contact with the contact face 88AG at this time. At this stage, the head 5 and the nut component 10A are subject to forces F17 and F18, which are rebound of F15 and F16 and whose severity is substantially equivalent to the result of F15 and F16 being attenuated somewhat, work in the arrow D2 direction. However, as described above, since the force F15 acting on the head 5 is equivalent to the force F16 acting on the nut component 10A, the force F17 generated by rebound and acting on the head 5 is also equivalent to the force F18 acting on the nut component 10A.

Here again, the rotational force in the arrow R2 direction acting on the lead screw 9 continues at this time as well. Just as in the case of the state shown in FIG. 11, this rotational force acts as a force to move the head 5 in the arrow D11 direction, while the nut component 10A is subject to a force in the direction in which it is forcibly moved by the force F18 in the arrow D2 direction, which is the opposite direction, so these forces act as mutually opposing forces. Accordingly, just as in the state shown in FIG. 11, the nut component 10A is subject to a force that would make it come out of the continuous groove 9A. However, with the state in the embodiment shown in FIG. 11, the force F14 is sufficiently smaller than the force F13, so the nut component 10A does not end up coming out of the continuous groove 9A, whereas with the state in the conventional configuration shown in FIG. 14, since the force F18 is equivalent to the force F17, the nut component 10A more readily comes out of the continuous groove 9A.

Figure 15:
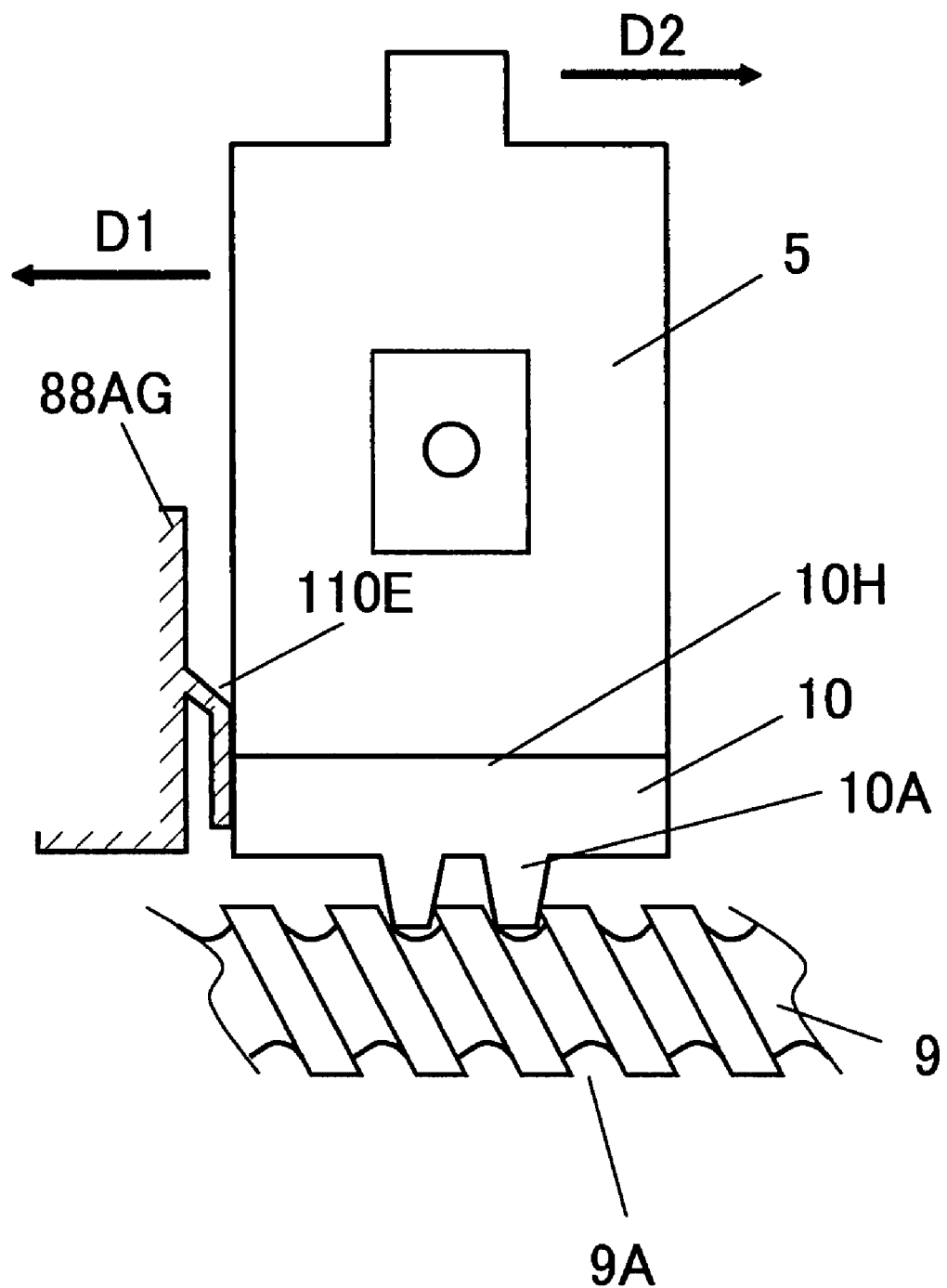
FIG. 15 is a schematic representation of the operation of another conventional power transmission member during the collision of the head.
Figure 16:
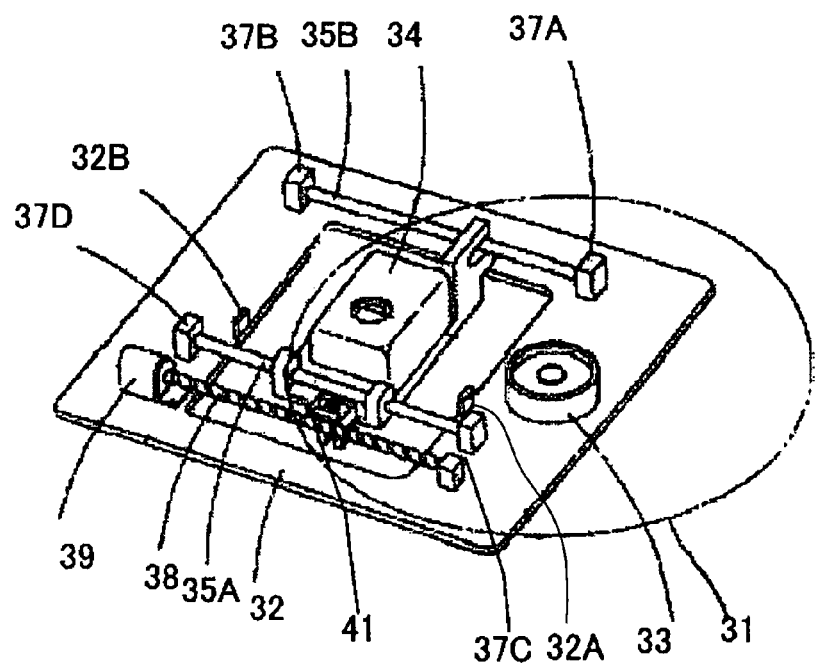
FIG. 16 is an oblique perspective view of the overall configuration of a head movement mechanism in a conventional disk device.
Figure 17:
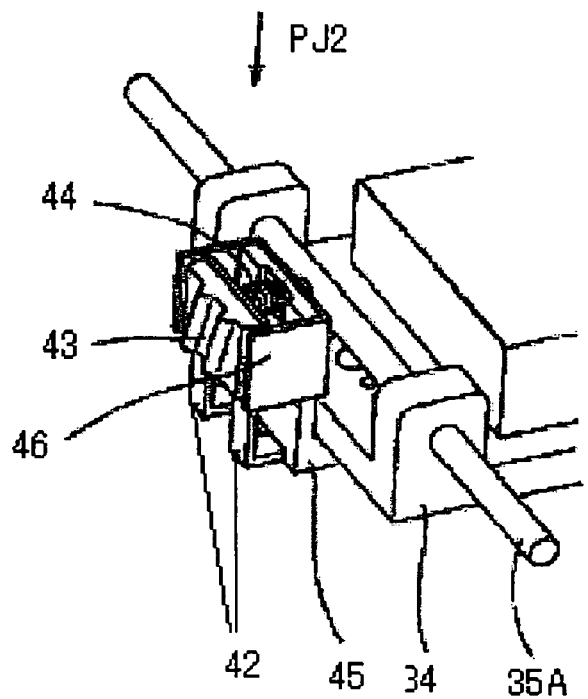
FIG. 17 is a detail view of the configuration of the power transmission member unit in the conventional disk device of FIG. 16.
Figure 18:
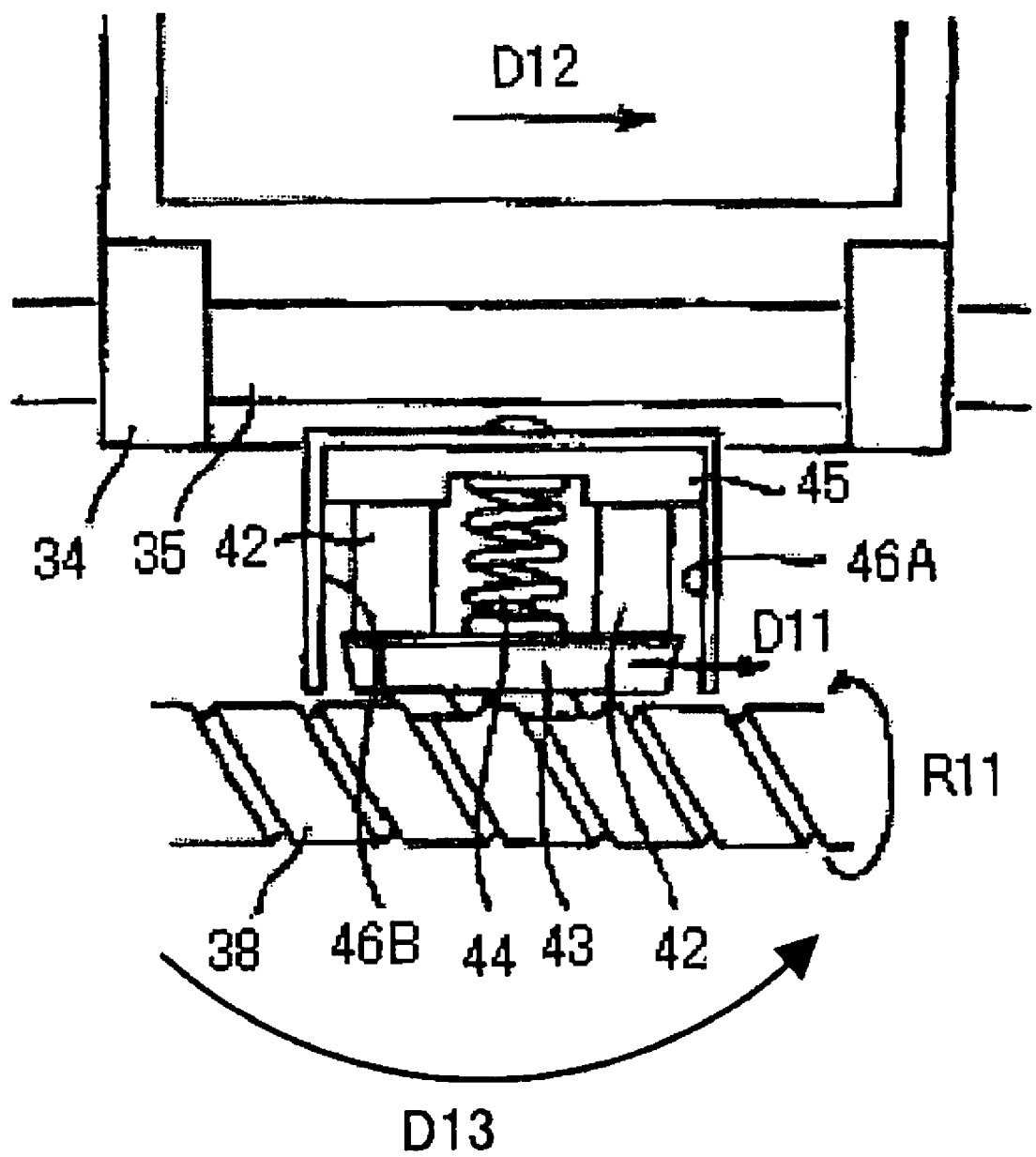
FIG. 18 is a detail view of a state in which the lead screw is engaged with the tooth component, out of the transmission unit in the conventional disk device of FIG. 16.
Figure 19:
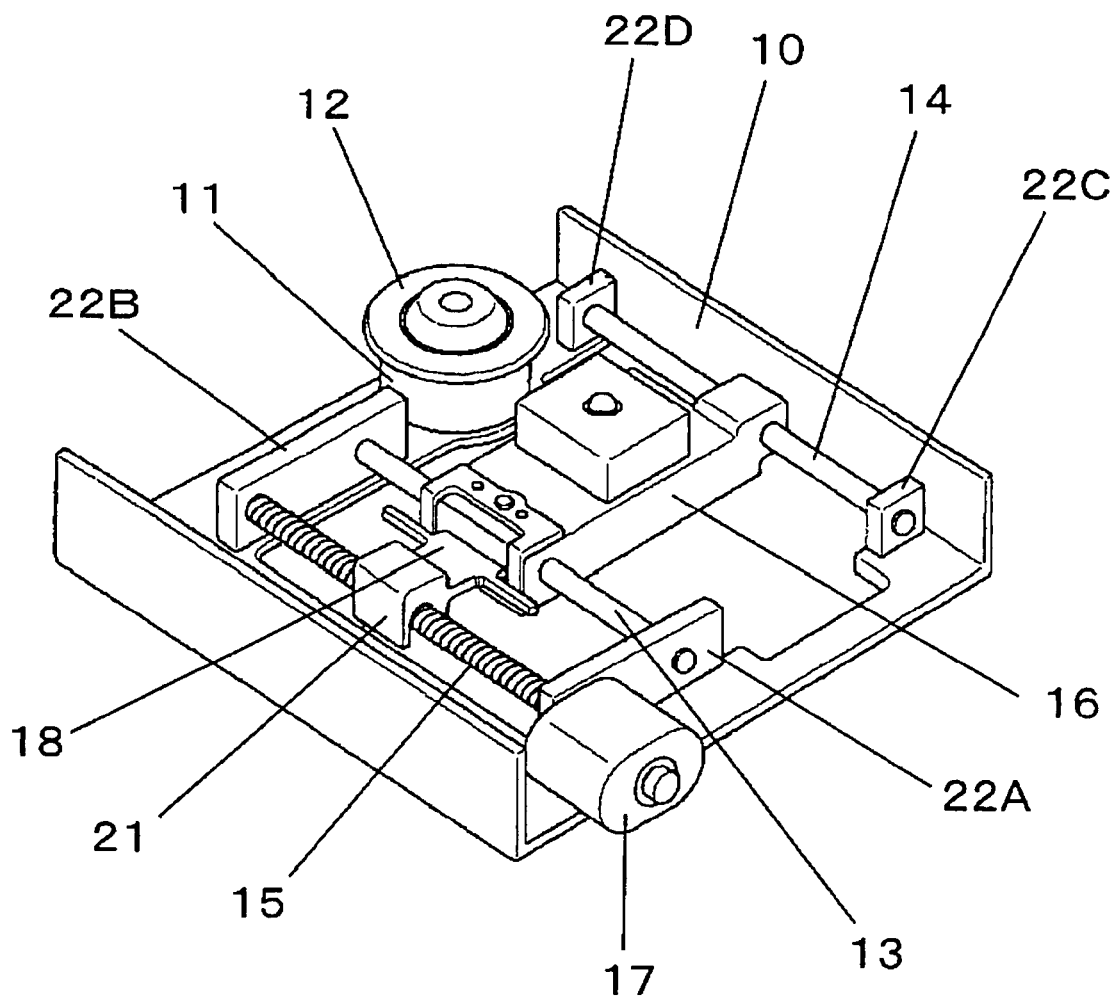
FIG. 19 is an oblique perspective view of the overall configuration of a head movement mechanism in another conventional disk device.
Figure 20:
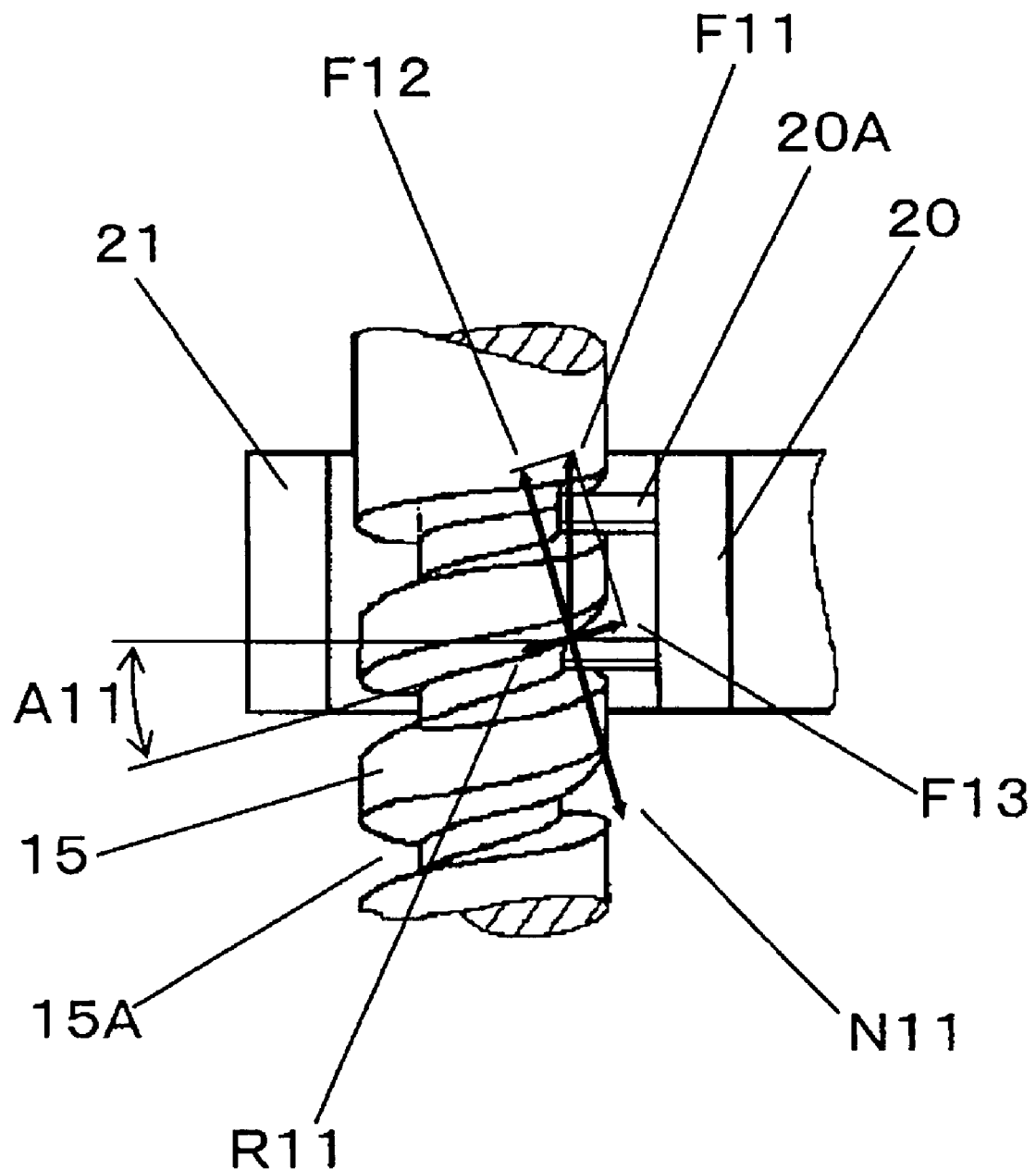
FIG. 20 is a detail view of a state in which the lead screw is engaged with the power transmission member in the conventional disk device of FIG. 19.

As shown in FIG. 15, this holds true in a configuration in which the cushioning spring component 110E is added not to the power transmission member 10, but to the contact surface 88A side.

Thus, in the embodiment, the power transmission member 10 is constituted so that the nut component 10A and the fixed side 10H are capable of elastic relative displacement, and therefore when the head 5 is forcibly moved, collides, and then rebounds, the nut component 10A can be prevented from coming out of the continuous groove 9A. As a result, it is possible to prevent the head 5 from being incapable of moving by the lead screw 9 after a collision.

Furthermore, an additional effect of the power transmission member 10 pertaining to this embodiment is that the head 5 is easier to position, and movement of the head 5 produces less noise and vibration. More specifically, the head 5 can be positioned with respect to the chassis 3 by bringing the nut-side contact face 10GB into contact with the contact face 8AG. However, when this contact is achieved by an ordinary movement operation of the head 5, this is limited to a case in which the rigidity of the support columns 10D and 10E is set such that the amount of bending of the support columns 10D and 10E will be sufficiently small with respect to the amount required for the movement precision of the head 5. Any noise and vibration produced by movement of the head 5 will be absorbed by minute movements of the support columns 10D and 10E.

Furthermore, with the power transmission member 10 in the above-described embodiment, in order for the nut support component 10C to have the function of being displaced with respect to the fixed side 10H, a structure involving the bending of the support columns 10D and 10E is used, but another structure that accomplishes the same function may be used instead. In the above embodiment, elasticity is obtained by bending the support columns 10D and 10E in their lengthwise direction, but it is also possible, for example, to obtain elasticity by the buckling of a column made of an elastic material.

Figure 6:
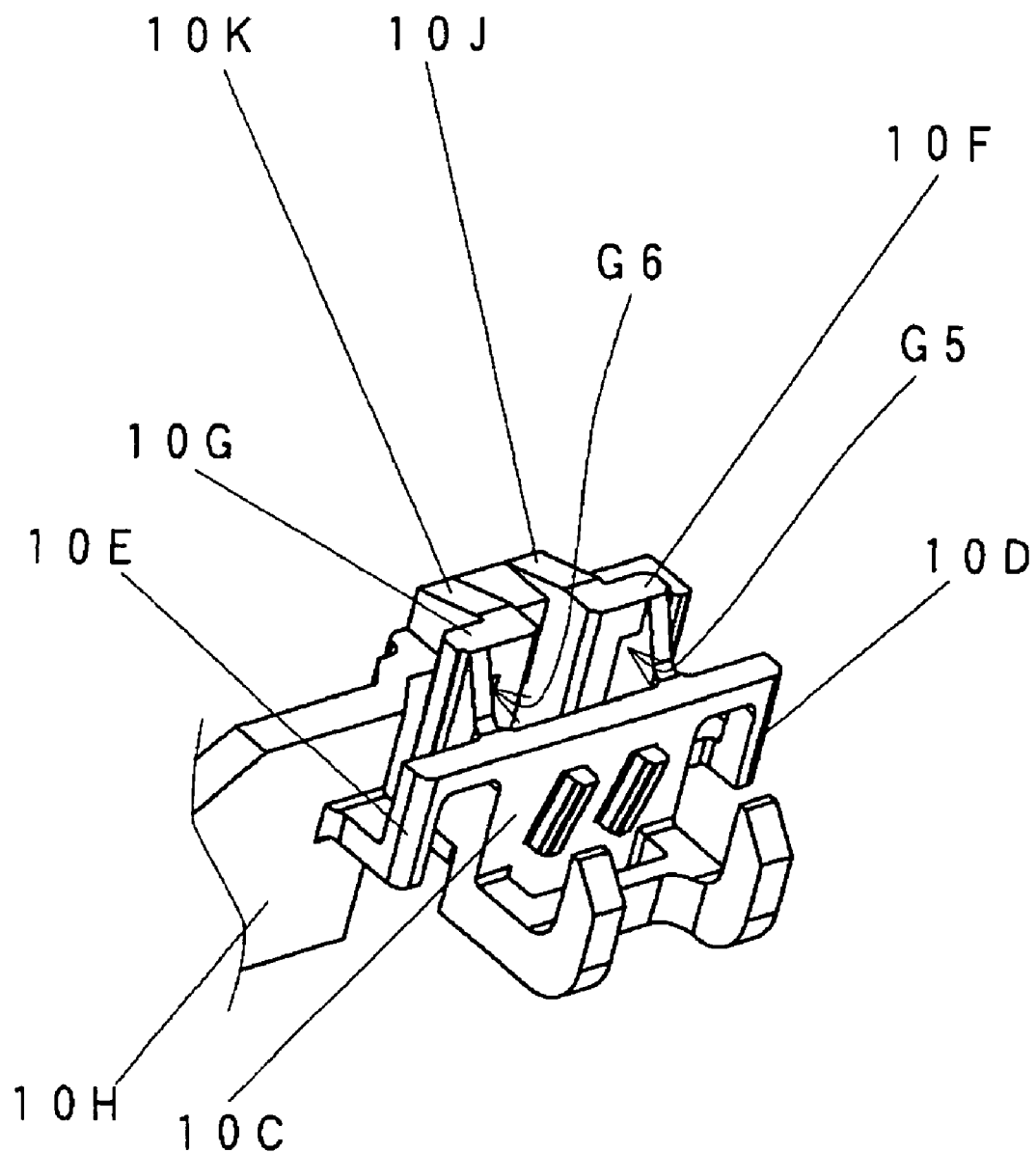
FIG. 6 is a diagram of the detailed configuration of the power transmission member in the disk device of the embodiment of the present invention.

If kinetic energy cannot be attenuated with just this elastic deformation, then as shown in FIG. 6, for example, another effective means is to increase the amount of energy that can be absorbed by partial linking, leaving gaps G5 and G6 between the nut support component contact column 10F and nut support component contact column 10G and the fixed component contact column 10J and fixed component contact column 10K, and thereby raising rigidity by having areas of elastic deformation extend entirely over these components.

Also, to further improve the attenuation effect in the above embodiment, it is effective to use an elastomer or other attenuating member to fill the gaps between the nut-side contact face 10FA and nut-side contact face 10GA and the fixed-side contact face 10JA and fixed-side contact face 10KA. Examples of materials suitable to this application include butyl rubber and silicone rubber.

Also, rather than filling the gaps with these attenuating members, it is possible to improve the attenuation effect by adding them to one of the faces of the nut-side contact face 10FA and nut-side contact face 10GA or the fixed-side contact face 10JA and fixed-side contact face 10KA.

Furthermore, the attenuation achieved by bending the support columns 10D and 10E, or the attenuation achieved by bringing the nut-side contact face 10FA and nut-side contact face 10 GA into contact with the fixed-side contact face 10JA and fixed-side contact face 10KA, can be improved by using an elastomer or other such material with good attenuation properties for the material that makes up the power transmission member 10.

Figure 7:
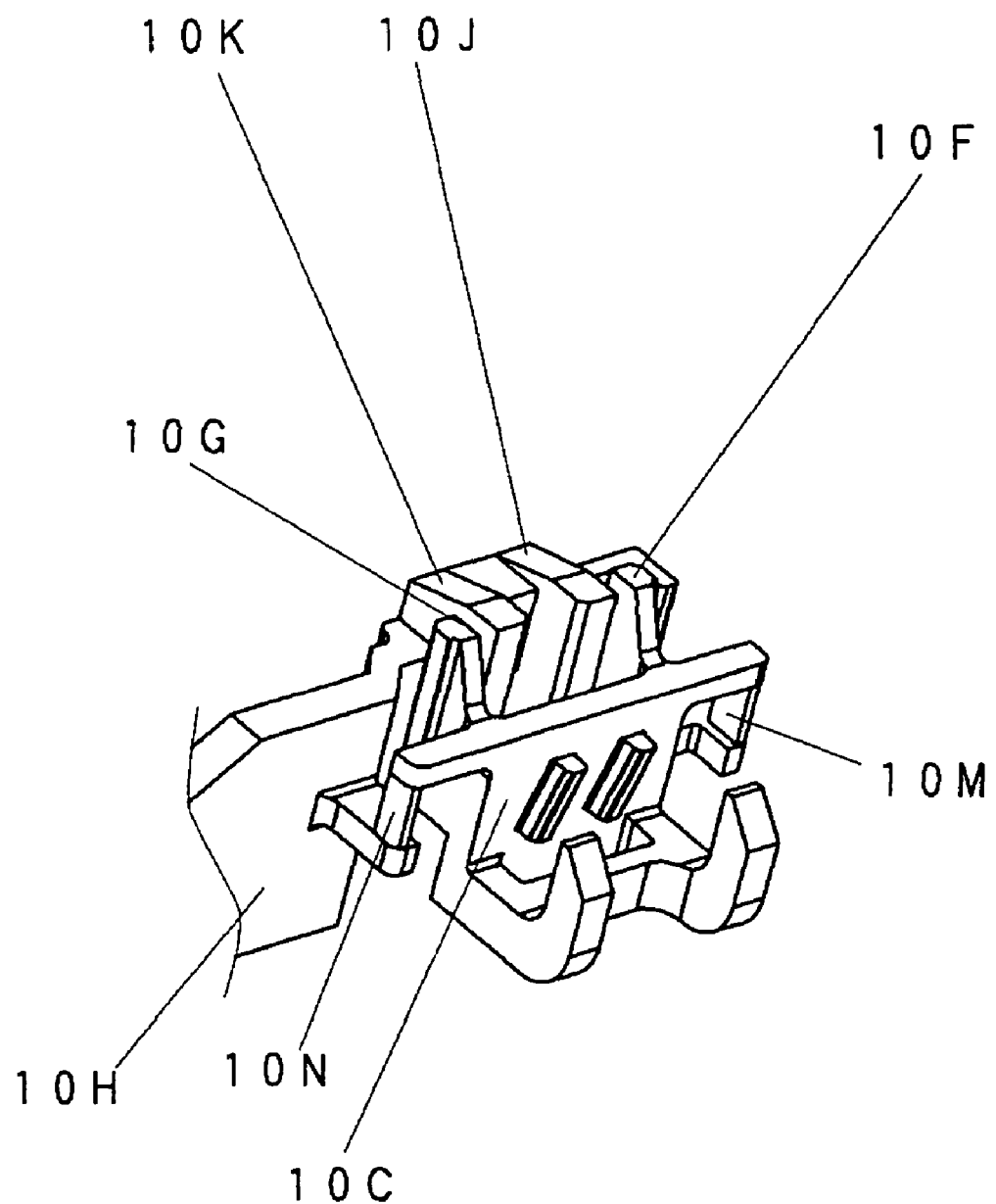
FIG. 7 is a diagram of the detailed configuration of the power transmission member in the disk device of the embodiment of the present invention.
Figure 8:
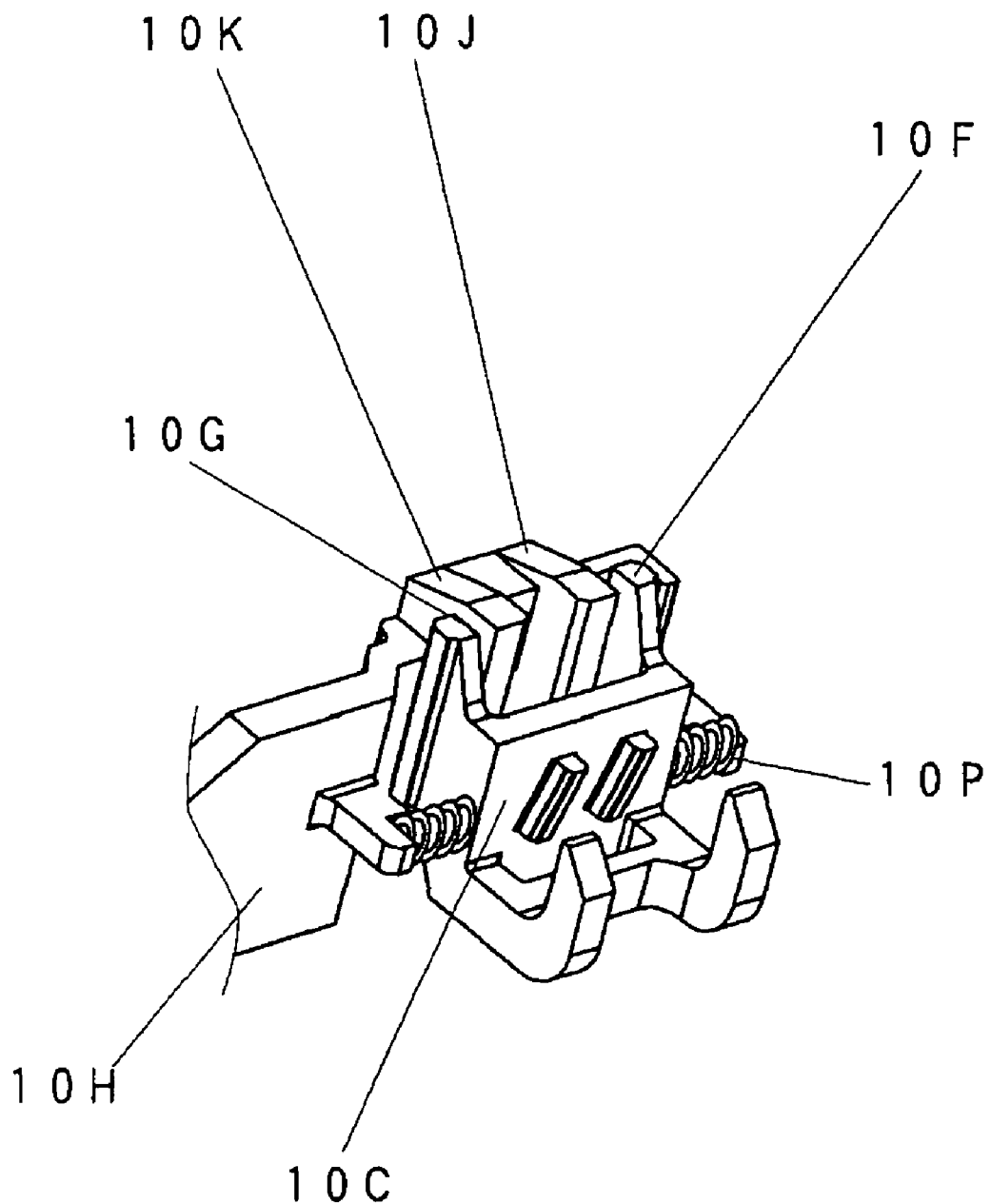
FIG. 8 is a diagram of the detailed configuration of the power transmission member in the disk device of the embodiment of the present invention.

Also, with the power transmission member 10 in the above embodiment, the nut support component 10C, the support columns 10D and 10E, and the fixed side 10H had an integral structure, but the nut support component 10C and the fixed side 10H may instead be linked by separate elastic members 10M and 10N, such as a leaf spring, as shown in FIG. 7. Or, as shown in FIG. 8, they may be linked by a separate elastic member such as a coil spring. In this case, the same effect can be obtained by choosing the proper spring constant.

The integral structure shown in FIG. 5 is effective in terms of reducing the number of parts required, but when the relationship with other functions is taken into account, manipulating the spring constant may be difficult. With the separate structures shown in FIGS. 7 and 8, more parts are required, but an advantage is that this affords greater freedom in setting the spring constant.

Furthermore, in the above embodiment, the head 5 was moved by employing a so-called thread-feed mechanism with the lead screw 9, but a so-called rack and pinion mechanism may be used instead.

INDUSTRIAL APPLICABILITY

The power transmission member and disk device of the present invention are effective as means for recording or reproducing data, and more specifically as recorders for recording audio or video content, players for reproducing the same, personal computer storage devices, and so forth.

The invention claimed is:

1. A power transmission member of a mechanism for moving a head, used for recording on or reproducing from a disk, relative to a base member in a disk device, comprising:
   a fixed component that is configured to be attached to the head;
   a power transmission component for receiving drive from a motor serving as a drive source;
   a linking component for linking the fixed component and the power transmission component; and
   a contacting component that is fixed to the power transmission component, for coming into contact with a contacted component that is part of the base member, or part of a member fixed to the base member, at least one end of a movement range of the head, wherein the contacting component is linked to the fixed component via the linking component in an elastic manner, and has a relative position being variable with respect to the fixed component in a movement direction of the head.

2. The power transmission member according to claim 1, wherein the contacting component has a first contacting component that comes into contact with the contacted component at one end of the movement range of the head, and a second contacting component that comes into contact with the contacted component at the other end of the movement range of the head, and the power transmission component is constituted integrally with the first contacting component and/or the second contacting component.

3. The power transmission member according to claim 1, wherein the fixed component, the power transmission component, the linking component, and the contacting component have an integral structure.

4. The power transmission member according to claim 1, wherein at least the fixed component, the power transmission component, and the linking component have a separate construction.

5. The power transmission member according to claim 1, wherein the fixed component, the power transmission component, the linking component, and the contacting component are composed of a resin material.

6. The power transmission member according to claim 4, wherein the linking component is constituted by a leaf spring.

7. The power transmission member according to claim 4, wherein the linking component is constituted by a coil spring.

8. The power transmission member according to claim 1, wherein the contacting component has a first contacting component that comes into contact with the contacted component at one end of the movement range of the head, and a second contacting component that comes into contact with the contacted component at the other end of the movement range of the head, and the fixed component has a third contacting component that is disposed across from said other end side of the first contacting component, with a specific gap interposed therebetween, and that limits the movement of the first contacting component to said other end side in the movement direction of the head, and a fourth contacting component that is disposed across from said one end side of the second contacting component, with a specific gap interposed therebetween, and that limits the movement of the second contacting component to said one end side in the movement direction of the head.

9. The power transmission member according to claim 1, wherein the contacting component is provided so as to come into contact with the contacted component at the end of the movement range of the head before coming into contact with the fixed component.

10. A head movement mechanism, comprising:
a power transmission mechanism that includes the power transmission member according to claim 1 and transmits power to the head; and
a motor that serves as the drive source of the power transmission mechanism.

11. A disk device, comprising:
a disk rotation mechanism for rotating a disk capable of recording or reproduction;
a head for recording on or reproducing from the disk;
a head movement mechanism for moving the head in a radial direction of the disk; and
a base member for integrally supporting the disk rotation mechanism, the head, and the head movement mechanism;
wherein the head movement mechanism has:
a power transmission mechanism that includes a power transmission member and transmits power to the head; and
a motor that serves as a drive source of the power transmission mechanism, the power transmission member has:
a fixed component that is configured to be attached to the head;
a power transmission component for receiving drive from the power transmission mechanism;
a linking component for linking the fixed component and the power transmission component; and
a contacting component that is fixed to the power transmission component, for coming into contact with a part of the base member, or part of a member fixed to the base member, at least one end of a movement range of the head, and
the contacting component is linked to the fixed component via the linking component in an elastic manner, and has a relative position being variable with respect to the fixed component in a movement direction of the head.

12. The disk device according to claim 11, wherein the power transmission mechanism further has a lead screw comprising a continuous spiral groove provided around an outer periphery of a cylindrical shaft thereof, the power transmission component of the power transmission member has a nut component at least part of which is provided with a spiral rib capable of engaging with the continuous groove, and the nut component is constituted integrally with the contacting component, and has a relative position being variable with respect to the head in at least the movement direction of the head.

* * * * *